United States Patent
Fan et al.

(10) Patent No.: US 11,632,571 B2
(45) Date of Patent: Apr. 18, 2023

(54) MEDIA DATA PROCESSING METHOD AND APPARATUS

(71) Applicant: HUAWEI TECHNOLOGIES CO., LTD., Guangdong (CN)

(72) Inventors: Yuqun Fan, Nanjing (CN); Ye-Kui Wang, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/232,584

(22) Filed: Apr. 16, 2021

(65) Prior Publication Data

US 2021/0243473 A1    Aug. 5, 2021

Related U.S. Application Data

(63) Continuation of application No. 16/373,640, filed on Apr. 3, 2019, now Pat. No. 11,032,570.

(Continued)

(51) Int. Cl.
*H04N 19/597* (2014.01)
*H04N 13/161* (2018.01)
(Continued)

(52) U.S. Cl.
CPC ......... *H04N 19/597* (2014.11); *H04N 13/161* (2018.05); *H04N 13/178* (2018.05); *H04N 19/167* (2014.11)

(58) Field of Classification Search
None
See application file for complete search history.

(56) References Cited

U.S. PATENT DOCUMENTS

| | | | |
|---|---|---|---|
| 7,929,027 B2 | 4/2011 | Okamoto et al. | |
| 8,342,961 B2 | 1/2013 | Ikeda | |

(Continued)

FOREIGN PATENT DOCUMENTS

| | | |
|---|---|---|
| CN | 101014123 A | 8/2007 |
| CN | 102056015 A | 5/2011 |

(Continued)

OTHER PUBLICATIONS

Madhukar Budagavi, "OMAF: Metadata for supporting Hotspots in omnidirectional video", Samsung Research America, ISO/IEC JTC1/SC29/WG11 MPEG2017/m41182, Jul. 2017, Torino, Italy, 2 pages.

(Continued)

*Primary Examiner* — Christopher Braniff
(74) *Attorney, Agent, or Firm* — Huawei Technologies Co., Ltd.

(57) ABSTRACT

This application provides a media data processing method and apparatus. A media processing device receives a media stream. The media stream includes media data recorded at a plurality of viewpoints. The device obtains metadata information of the media stream. The metadata information includes viewpoint identification information of the viewpoints. The device displays media data of a first viewpoint based on the viewpoint identification information. The device also displays indications of other viewpoints when displaying the media data of the first viewpoint, so that a user of the device can switch to display media data of other viewpoints.

16 Claims, 5 Drawing Sheets

Related U.S. Application Data

(60) Provisional application No. 62/652,330, filed on Apr. 4, 2018, provisional application No. 62/652,305, filed on Apr. 3, 2018.

(51) Int. Cl.
*H04N 13/178* (2018.01)
*H04N 19/167* (2014.01)

(56) References Cited

U.S. PATENT DOCUMENTS

| | | | |
|---|---|---|---|
| 8,400,524 | B2 | 3/2013 | Okamoto et al. |
| 8,719,309 | B2 | 5/2014 | Singer |
| 10,375,375 | B2 | 8/2019 | Hwang et al. |
| 2008/0158384 | A1 | 7/2008 | Okamoto et al. |
| 2010/0262628 | A1 | 10/2010 | Singer |
| 2010/0279770 | A1 | 11/2010 | Ikeda |
| 2011/0157316 | A1 | 6/2011 | Okamoto et al. |
| 2014/0089398 | A1 | 3/2014 | Zhang et al. |
| 2014/0368495 | A1* | 12/2014 | Wei ............ H04N 13/117 345/419 |
| 2015/0110467 | A1 | 4/2015 | Ying et al. |
| 2017/0347026 | A1 | 11/2017 | Hannuksela |
| 2018/0063505 | A1 | 3/2018 | Lee et al. |
| 2018/0063574 | A1 | 3/2018 | Stockhammer et al. |
| 2018/0077451 | A1 | 3/2018 | Yip et al. |
| 2018/0270427 | A1 | 9/2018 | Damstra et al. |
| 2018/0332265 | A1 | 11/2018 | Hwang et al. |
| 2018/0350126 | A1 | 12/2018 | Oh |
| 2019/0065626 | A1 | 2/2019 | Cameron et al. |
| 2019/0104326 | A1 | 4/2019 | Stockhammer et al. |
| 2019/0364261 | A1 | 11/2019 | Hwang et al. |
| 2020/0228775 | A1* | 7/2020 | Sakai ............ H04N 13/156 |

FOREIGN PATENT DOCUMENTS

| | | |
|---|---|---|
| CN | 102217322 A | 10/2011 |
| CN | 106921864 A | 7/2017 |

OTHER PUBLICATIONS

ISO/IEC 23009-1, Second edition, Information technology—Dynamic adaptive streaming over HTTP (DASH)—Part 1: Media presentation description and segment formats, May 15, 2014, 152 pages.

ISO/IEC FDIS 23090-2:201x (E), ISO/IEC JTC 1/SC 29/WG 11, Information technology—Coded representation of immersive media (MPEG-I)—Part 2: Omnidirectional media format. Feb. 7, 2018, 178 pages.

R Skupin et al.,"Standardization status of 360 degree video coding and delivery", 2017 IEEE Visual Communications and Image Processing (VCIP), Mar. 1, 2018, total 4 pages.

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems Infrastructure of audiovisual services—Coding of moving video, High efficiency video coding, total 692 pages.

* cited by examiner

MEDIA DATA PROCESSING METHOD AND APPARATUS

CROSS-REFERENCE TO RELATED APPLICATIONS

This application a continuation of U.S. patent application Ser. No. 16/373,640, filed on Apr. 3, 2019, now U.S. Pat. No. 10,992,957. which claims priority to U.S. Provisional Application No. 62/652,305, filed on Apr. 3, 2018 and U.S. Provisional Application No. 62/652,330, filed on Apr. 4, 2018, All of the afore-mentioned patent applications are hereby incorporated by reference in their entireties.

TECHNICAL FIELD

This application relates to the field of streaming media transmission technologies, and in particular, to a media data processing method and apparatus.

BACKGROUND

ISO (the International Organization for Standardization) and IEC (the International Electrotechnical Commission) form the specialized system for worldwide standardization. The ISO/IEC 23090-2 standard specification, titled "Information Technology—Coded Representation of Immersive Media—Part 2: Omnidirectional Media Format", which is also referred to as the Omnidirectional Media Format (OMAF) specification hereinafter, defines a media format that enables omnidirectional media applications. The media format can be used in presentation of an omnidirectional media in an application. Omnidirectional media mainly refers to omnidirectional videos (360-degree videos), images and audio, as well as associated text. In the OMAF specification, a list of projection methods that can be used to convert a spherical video into a two-dimensional video is specified. Further, how to store, in an ISO base media file format (ISOBMFF), omnidirectional media and metadata associated with the media is described. Also specified are how to encapsulate omnidirectional media data in a streaming media system and how to transmit the omnidirectional media data using transmission methods such as Dynamic Adaptive Streaming over Hypertext Transfer Protocol (HTTP) (Dynamic Adaptive Streaming over HTTP, DASH) transmission and Dynamic Adaptive Streaming transmission as specified in the ISO/IEC 23009-1 standard.

The ISO base media file format (ISOBMFF) includes a series of boxes, and one box may further include another box. A box includes a metadata box (moov box) and a media data box (mdat box). The metadata box includes metadata, and the media data box includes media data. The metadata box and the media data box may be in a same file or in separate files. If timed metadata is encapsulated in the ISO base media file format, the metadata box includes metadata that is used to describe timed metadata, and the media data box includes the timed metadata.

In an existing solution, when media data corresponding to a plurality of viewpoints coexist, it is difficult to differentiate and flexibly process media data at different viewpoints.

SUMMARY

This application provides a media data processing method and apparatus, to differentiate and flexibly process media data corresponding to different viewpoints.

According to a first aspect, a media data processing method is provided. The method includes: obtaining metadata information; and processing media data based on viewpoint identification information included in the metadata information.

The viewpoint identification information may also be referred to as viewpoint grouping information that is used to indicate a viewpoint to which the media data belongs.

The metadata information may be some attribute information that is used to describe the media data, for example, duration of the media data, a bit rate, a frame rate, and the viewpoint to which the media data belongs.

The media data may be omnidirectional media data, and the omnidirectional media data may be video data and/or audio data.

It should be understood that, before the processing media data based on viewpoint identification information, the method further includes: obtaining the viewpoint identification information from the metadata information.

The viewpoint identification information may be used to describe the viewpoint corresponding to the media data. The viewpoint identification information may indicate an ID of the viewpoint corresponding to the media data, a viewpoint number corresponding to the media data, or the like.

The viewpoint may be a position in which a video camera or a video camera array is placed when a video is being shot.

When a video is being shot, a single viewpoint or a plurality of viewpoints may be used. For example, when a video is shot by using one video camera or one video camera array, there is one corresponding viewpoint; or when a picture of a scene is shot by using a plurality of video cameras or a plurality of video camera arrays, there are a plurality of corresponding viewpoints. Usually a video camera array including a plurality of video cameras needs to be used to shoot a panoramic video or a 360-degree video. The video camera array herein is usually corresponding to a plurality of shooting viewport.

When a video camera is used to shoot a picture of a scene at a particular viewpoint, a video of one viewport may be obtained, or videos of a plurality of viewport may be obtained, or a panoramic video or a 360-degree video may be obtained.

In this application, a viewport is a viewing orientation selected by a user to watch a video. When the user watches a panoramic video or a 360-degree video, the viewport may be an angle formed between lines of sight of the user and a sphere on which the video is located.

In this application, because the viewpoint identification information is carried in the metadata information, media data corresponding to different viewpoints can be differentiated and flexibly processed by using the viewpoint identification information in the metadata information.

Further, the processing media data may be: presenting the media data. In this case, media data at a viewpoint that needs to be presented may be flexibly selected by using the viewpoint identification information, so that flexible switching between videos at different viewpoints can be implemented.

In a possible implementation, the media data processing method further includes: obtaining viewpoint selection information; and the processing media data based on viewpoint identification information includes: determining a first viewpoint based on the viewpoint selection information and the viewpoint identification information; and processing the media data corresponding to the first viewpoint.

The viewpoint selection information may be used to indicate a viewpoint selected by the user. When the method is performed by a client, the client may obtain viewpoint indication information based on an input performed by the user by touching a display screen of the client or by operating a key of the client.

In this application, the client may obtain the viewpoint selection information based on an input performed by the user on an operation interface of the client, so as to select and present a video at a viewpoint that the user wants to watch, thereby bringing better visual experience to the user.

In a possible implementation, before the processing the media data corresponding to the first viewpoint, the method further includes: determining whether the media data corresponding to the first viewpoint is already obtained.

When the client receives the media data corresponding to the first viewpoint, it may be determined that the client already obtains the media data corresponding to the first viewpoint; or when the client has not locally received the media data corresponding to the first viewpoint, the client needs to first obtain the media data corresponding to the first viewpoint from a server side before processing the media data.

It should be understood that when the client has not obtained the media data corresponding to the first viewpoint, the method further includes: obtaining, based on the viewpoint identification information and the metadata information, the media data corresponding to the first viewpoint.

For example, the server side totally temporarily stores media data corresponding to the first viewpoint, the second viewpoint, and the third viewpoint. In this case, the client may request, from the server side, to obtain a bitstream of the media data corresponding to the first viewpoint, and parse the bitstream to obtain the media data corresponding to the first viewpoint. For a specific manner of obtaining the media data, refer to relevant specifications in standards such as MPEG-DASH. Details are not described herein.

In a possible implementation, the processing the media data corresponding to the first viewpoint includes: presenting the media data corresponding to the first viewpoint.

In a possible implementation, the viewpoint identification information is carried in any one of a media data track, a media presentation description (MPD), and supplementary enhancement information (SEI). The viewpoint identification information may be obtained by parsing the media data track, the MPD, or the SEI.

In a possible implementation, the metadata information may further include viewpoint position information, and the viewpoint position information is used to indicate a viewpoint position.

Optionally, viewpoint position is a position of a viewpoint in a spherical coordinate system or a three-dimensional Cartesian spatial coordinate system.

The viewpoint position information may indicate both a position of a viewpoint to which media data corresponding current metadata information belongs and a position of another viewpoint other than the media data corresponding to the current metadata information.

When a position of a viewpoint to which media data corresponding to the metadata information belongs is a viewpoint 1, the viewpoint position information in the metadata information may indicate a position of a viewpoint 2 in a sphere region in which video data at the viewpoint 1 is located. The viewpoint 2 may be a viewpoint having a viewport that partially overlaps a viewport of the viewpoint 1.

In a possible implementation, when the viewpoint position remains unchanged (i.e. the viewpoint position is a static position), the viewpoint position information is carried in box information, the SEI, or the MPD.

When the viewpoint position remains unchanged, a viewpoint position (x, y, z) may be added to a track group box, to indicate the position of the viewpoint in the three-dimensional Cartesian coordinate system.

In a possible implementation, when the viewpoint position may change, the viewpoint position information is carried in the MPD.

Optionally, the viewpoint position information is carried in the MPD, the MPD includes a first field, and the first field is used to indicate that the viewpoint position is a static position or a dynamic position.

When the first field indicates that viewpoint position is a static position, the MPD includes the position of the viewpoint in the three-dimensional Cartesian coordinate system. When the first field indicates that viewpoint position is a dynamic position, the MPD includes the viewpoint but not a specific position of the viewpoint.

Optionally, when viewpoint position is a static position, information about the viewpoint in the three-dimensional Cartesian coordinate system is directly carried in the MPD.

In this case, a field indicating that the viewpoint position is a static position or a dynamic position is no longer carried in the MPD.

Optionally, when the viewpoint position is a dynamic position, the viewpoint position is carried in a timed metadata track that is in the MPD and that is associated with the media data.

In a possible implementation, when the viewpoint position may change, the viewpoint position information is carried in a timed metadata track.

Optionally, the viewpoint position information and the viewpoint identification information are carried in a same timed metadata track.

Optionally, the viewpoint position information and the viewpoint identification information are carried in different timed metadata tracks, and a timed metadata track in which the viewpoint position information is located is associated with a timed metadata track in which the viewpoint identification information is located.

Optionally, each timed metadata track carries one piece of viewpoint position information.

In this case, when there are totally N (N is greater than or equal to 1) viewpoints in a video stream, N pieces of viewpoint position information need to be carried by using N timed metadata tracks.

Optionally, one timed metadata track carries a plurality of pieces of viewpoint position information.

In this case, when there are totally N (N is greater than or equal to 1) viewpoints in a video stream, N pieces of viewpoint position information may be carried by using only one timed metadata track.

Optionally, the viewpoint position information is carried in a sample group box of the media data track, and the viewpoint position information is used to indicate a position of a viewpoint of a sample in a sample group.

In this application, different viewpoint positions can be flexibly indicated by using the viewpoint position information, so that the user can flexibly switch between different viewpoints when watching a video.

In a possible implementation, the metadata information further includes recommended viewport information, and the processing media data based on viewpoint identification information includes: processing the media data based on the viewpoint identification information and the recommended viewport information.

The recommended viewport may be a viewport recommended by a director's cut.

In a possible implementation, the recommended viewport information is carried in the timed metadata track.

The recommended viewport information may indicate a viewing orientation recommended by a video producer or a director, and the client may present, to the user based on the recommended viewport information, media content that the video producer or the director wants to present to the user. Because the metadata track further includes the viewpoint identification information, the client may present video content of recommended viewport at specified viewpoint to the user.

In this application, because the metadata track further includes the viewpoint identification information in addition to the recommended viewport information, the user can select, from the range of recommended viewports, a video at a corresponding viewpoint to watch. Therefore, this application enables the user to flexibly switch between different viewpoints in the range of recommended viewport.

In addition to the recommended viewport information, the timed metadata track may include the viewpoint identification information.

In a possible implementation, the timed metadata track carries the recommended viewport information and the viewpoint identification information.

When the timed metadata track carries the viewpoint identification information, the following cases may be included:

Optionally, a new type is defined in the timed metadata track to carry the viewpoint identification information.

Optionally, a new timed metadata track is defined to carry the viewpoint identification information.

Optionally, the timed metadata track is redefined to carry the viewpoint identification information.

According to a second aspect, a media data processing apparatus is provided. The apparatus includes a module configured to perform the method in the first aspect.

According to a third aspect, a computer readable storage medium is provided. The computer readable storage medium stores an instruction. When running on a computer, the instruction enables the computer to perform the method according to the first aspect.

According to a fourth aspect, a computer program product that includes an instruction is provided. When running on a computer, the instruction enables the computer to perform the method according to the first aspect.

According to a fifth aspect, an electronic device is provided, including the media data processing apparatus according to the second aspect.

It should be understood that for beneficial effects achieved in the second to the fifth aspects and the corresponding implementations of this application, reference may be made to beneficial effects achieved in the first aspect and the corresponding implementations of this application. Details are not described.

DESCRIPTION OF THE EMBODIMENTS

Figure 1:
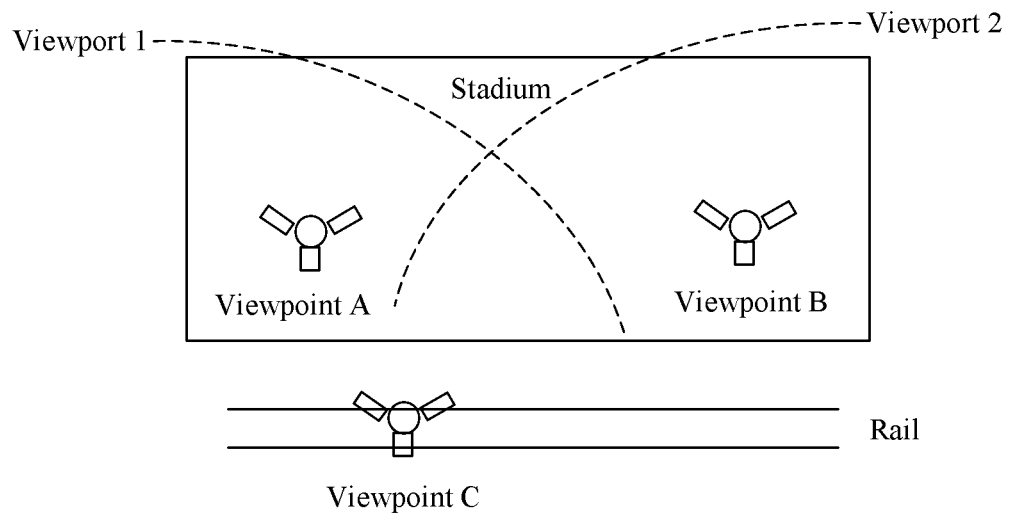
FIG. 1 is a schematic diagram of a possible application scenario according to an embodiment of this application.

The following describes the technical solutions in this application with reference to the accompanying drawings.

To better understanding the media data processing method provided in the embodiments of this application, the following first briefly describes some basic concepts related to the media data processing.

Track: A track is a series of timed samples encapsulated in an ISO base media file format (ISOBMFF). For example, in a video track, a video sample is obtained by encapsulating a bitstream based on an ISOBMFF specification, and the bitstream is generated by encoding frames of a video.

The track is defined in the ISO/IEC 14496-12 standard as a "timed sequence of related samples (q.v.) in an ISO base media file".

For media data, a track is a sequence of image samples or audio samples. For hinted tracks, a track corresponds to a streaming channel.

Box: An ISOBMFF file includes a plurality of boxes, and one box may include other boxes. a box is defined in the ISO/IEC 14496-12 standard as an "object-oriented building block defined by a unique type identifier and length".

In addition, a box is also called an "atom" in some specifications, including a first definition of MP4.

Supplementary enhancement information (SEI): SEI is a type of network abstract layer unit (NALU) defined in the video encoding and decoding standards H.264 and H.265 released by the International Telecommunication Union (ITU).

Media presentation description (MPD): MPD is a kind of document specified in the ISO/IEC 23009-1 standard, and the document includes metadata for a client to construct an HTTP-URL. The MPD includes one or more period elements. Each period element includes one or more adaptation sets. Each adaptation set includes one or more representations, and each representation includes one or more segments. A client selects a representation based on information in the MPD, and constructs an http-URL of a segment.

To describe time-related attribute information in media data, a timed metadata track of a region on a sphere is specified in the Omnidirectional Media Format (OMAF) standard. A metadata box in the metadata track includes metadata that is used to describe the sphere. The metadata box describes an intention of the timed metadata track, i.e., what the sphere region is used for. In the OMAF standard, two types of timed metadata tracks are described: a recommended viewport timed metadata track and an initial viewport timed metadata track. The recommended viewport timed metadata track describes the viewport that is recommended to a terminal for representation; and the initial viewport timed metadata track describes an initial viewing orientation when an omnidirectional video is watched.

In an existing OMAF standard, a format of a sphere region sample entry (Sample Entry) is specified as follows:

```
class SphereRegionSampleEntry(type) extends MetaDataSampleEntry(type)
{
SphereRegionConfigBox( ); // mandatory
Box[ ] other_boxes; // optional
}
class SphereRegionConfigBox extends FullBox('rosc', version=0, flags)
{
unsigned int(8) shape_type;
bit(7) reserved=0;
unsigned int(1) dynamic_range_flag;
if (dynamic_range_flag==0)
{
unsigned int(32) static_azimuth_range;
unsigned int(32) static_elevation_range;
}
unsigned int(8) num_regions;
}
```

Semantics of fields in the above sphere region sample entry is as follows:
- shape_type: describes a shape type of a sphere region;
- reserved: indicates a reserved field;
- dynamic_range_flag: when the value is 0, indicates that horizontal and vertical ranges of the region remain unchanged; when the value is 1, indicates that horizontal and vertical range of the region are described in a sample;
- static_azimuth_range: indicates an azimuth coverage range of the region;
- static_elevation_range: indicates an elevation coverage range of the region;
- num_regions: indicates number of regions in a metadata track.

In the OMAF, two shape types of sphere region are defined. One is a shape formed by combining four azimuth circles, and a shape_type value of the shape is 0. Another is a shape formed by combining two azimuth circles and two elevation circles, and a shape_type value of the shape is 1.

In an existing OMAF standard, a format of a sphere region sample (Sample) is specified as follows:

```
aligned(8) SphereRegionStruct(range_included_flag)
{
signed int(32) center_azimuth;
signed int(32) center_elevation;
signed int(32) center_tilt;
  if (range_included_flag)
  {
  unsigned int(32) azimuth_range;
  unsigned int(32) elevation_range;
  }
  unsigned int(1) interpolate;
  bit(7) reserved=0;
}
aligned(8) SphereRegionSample( )
{
for(i=0;i<num_regions;i++)
SphereRegionStruct(dynamic_range_flag)
}
```

Semantics of fields in the sphere region sample is as follows:
- center_azimuth and center_elevation: indicate a center point of a sphere region;
- center_tilt: indicates a tilt angle of the sphere region;
- azimuth_range: indicates an azimuth coverage range of the sphere region;
- elevation_range: indicates an elevation coverage range of the sphere region.

A video program may be shot by multiple cameras, so that different visual angles (called viewports hereinafter) can be flexibly switched when playing the video. The multi-camera shooting is characterized by recoding videos at a plurality of camera positions (called viewpoints hereinafter) at the same time, and a video can be played at different viewports through switching between different viewpoints.

For example, in a process of shooting a video, two viewpoints are used for shooting panoramic videos separately: viewpoint A and viewpoint B. Therefore, in a shot video, when the viewpoint A appears in a particular region in a 360-degree panoramic video shot at the viewpoint B, the foregoing sphere region structure may be used to define a position of a viewpoint A in the video shot at the viewpoint B. A 360-degree panoramic video shot at the viewpoint A may be represented by a uniform resource identifier (URI) link. When a user watches the video shot at the viewpoint B, the user may switch to watch the video shot at the viewpoint A using the URI link associated with the viewpoint A, the video shot at the viewpoint A.

The following sample syntax may be used to define a position of a viewpoint relative to another viewpoint in a sphere region structure:

```
class HotspotSample( ) extends SphereRegionSample
{
string hotspot_uri;
}
```

In the foregoing syntax, a URI that is associated with a sphere region and that is directed to a link to a 360-degree panoramic video at another viewpoint is defined by using the field hotspot_uri.

In the foregoing manner, because the URI is an out-of-band connection, it is impossible to distinguish whether the two viewpoints belong to shooting of a same scene (or a same event). In addition, the URI may be easily changed or redirected in a network transmission process. Therefore, a video associated with a viewpoint cannot be reliably expressed by using an URI.

In view of this, embodiments of this application provide a media data processing method, in which viewpoint identification information is added to metadata information of media data, so as to indicate a viewpoint corresponding to the media data. This way, the media data can be processed (for example, presented) based on the viewpoint, and videos at different viewpoints can be displayed more flexibly.

FIG. 1 is a schematic diagram of a possible application scenario according to an embodiment of this application.

As shown in FIG. 1, a viewpoint A, a viewpoint B, and a viewpoint C are arranged in a stadium to shoot a video. Positions of the viewpoint A and the viewpoint B are fixed. The viewpoint C is located on a rail, and the position of the viewpoint C may be changed at any time. Video cameras are placed at each of the viewpoint A, the viewpoint B, and the viewpoint C, for shooting a 360-degree panoramic video. A viewport for shooting a video at the viewpoint A is viewport 1. A viewport for shooting a video at the viewpoint B is viewport 2. The viewport 1 and the viewport 2 partially overlap. Therefore, the viewpoint A can be observed at region of video shooting at the viewpoint B, and viewpoint B can be observed at region of video shooting at the viewpoint A.

Figure 2:
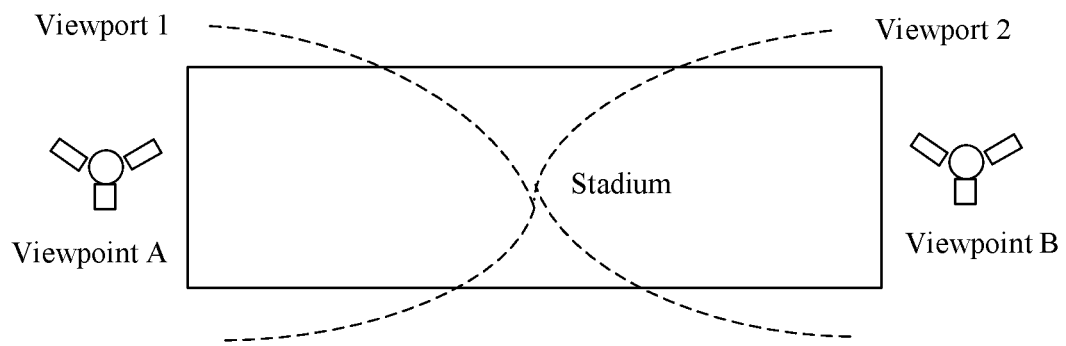
FIG. 2 is a schematic diagram of another possible application scenario according to an embodiment of this application.

FIG. 2 shows another possible application scenario according to an embodiment of this application. In FIG. 2, a viewpoint A and a viewpoint B are arranged in a stadium, and the viewpoint A and the viewpoint B are respectively fixed at the two opposite sides of the stadium. A viewport for shooting a video at the viewpoint A is viewport 1; and a viewport for shooting a video at the viewpoint B is viewport 2. The viewport 1 and the viewport 2 do not overlap. Because the viewport for shooting a video at the viewpoint A and the viewport for shooting a video at the viewpoint B do not overlap, the viewpoint A cannot be observed from any region of video shooting at the viewpoint B, and the viewpoint B cannot be observed from any region of video shooting at the viewpoint A.

It should be understood that the stadium is only used as an example in both FIG. 1 and FIG. 2, to show scenarios in which multiple panoramic videos are shot at a plurality of viewpoints. Actually, there are many other scenarios, in which multiple panoramic videos can be shot at a plurality of viewpoints. For example, multi-camera shooting can be used in television program production, or multi-camera shooting can be used in recording a live performance. Any scenarios in which multiple panoramic videos are shot at a plurality of viewpoints fall within the scope of this application.

Figure 3:
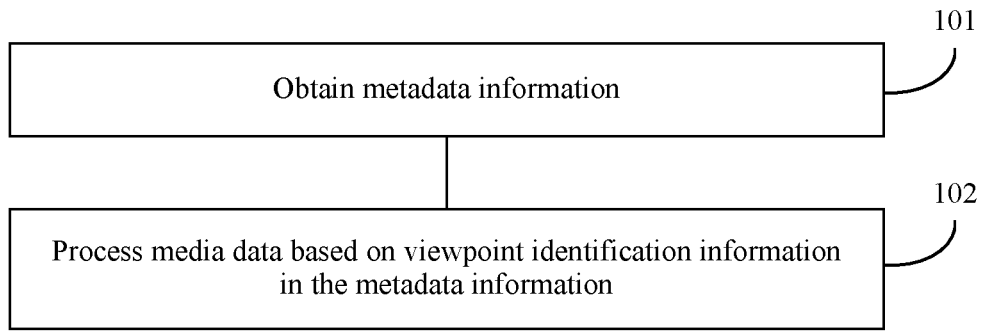
FIG. 3 is a flowchart of a media data processing method according to an embodiment of this application.

FIG. 3 is a flowchart of a media data processing method according to an embodiment of this application. The method may be performed by a decoding device. Normally, a decoding device is an electronic computing device or a hardware or software component of an electronic computing device, and the decoding device herein may be a video decoder, a device having a video decoding function, a video player (for example, an electronic device capable of processing multimedia data), or the like. The method shown in FIG. 3 includes step 101 and step 102. The following describes step 101 and step 102 in detail.

101. Obtaining metadata information.

The metadata information may be attribute information that is used to describe media data. For example, the metadata information may include duration of the media data, bit rate, frame rate, or viewpoint identification information of a viewpoint to which the media data belongs.

In addition, the media data described by using the metadata information may be omnidirectional media data, and the omnidirectional media data may be video data and/or audio data.

102. Processing media data based on the viewpoint identification information in the metadata information.

In this application, the viewpoint identification information may also be referred to as viewpoint grouping information.

The viewpoint identification information carried in the metadata information is used to indicate a viewpoint. For example, metadata information of first media data includes first viewpoint identification information, and the first viewpoint identification information indicates a first viewpoint. Therefore, the first media data is media data shot at the first viewpoint.

In addition, before the step 102 of processing the media data based on the viewpoint identification information, the viewpoint identification information carried in the metadata information may be first obtained from the metadata information.

Optionally, the viewpoint identification information may be a viewpoint identifier (ID). Each viewpoint corresponds to one ID, and different IDs indicate different viewpoints.

In this application, because the viewpoint identification information is carried in the metadata information, media data corresponding to different viewpoints can be flexibly processed by using the viewpoint identification information in the metadata information.

Further, the step 102 of processing the media data may include presenting the media data. In this case, media data at a viewpoint that needs to be presented may be flexibly selected by using the viewpoint identification information, so that flexible switching between videos at different viewpoints can be achieved.

Figure 4:
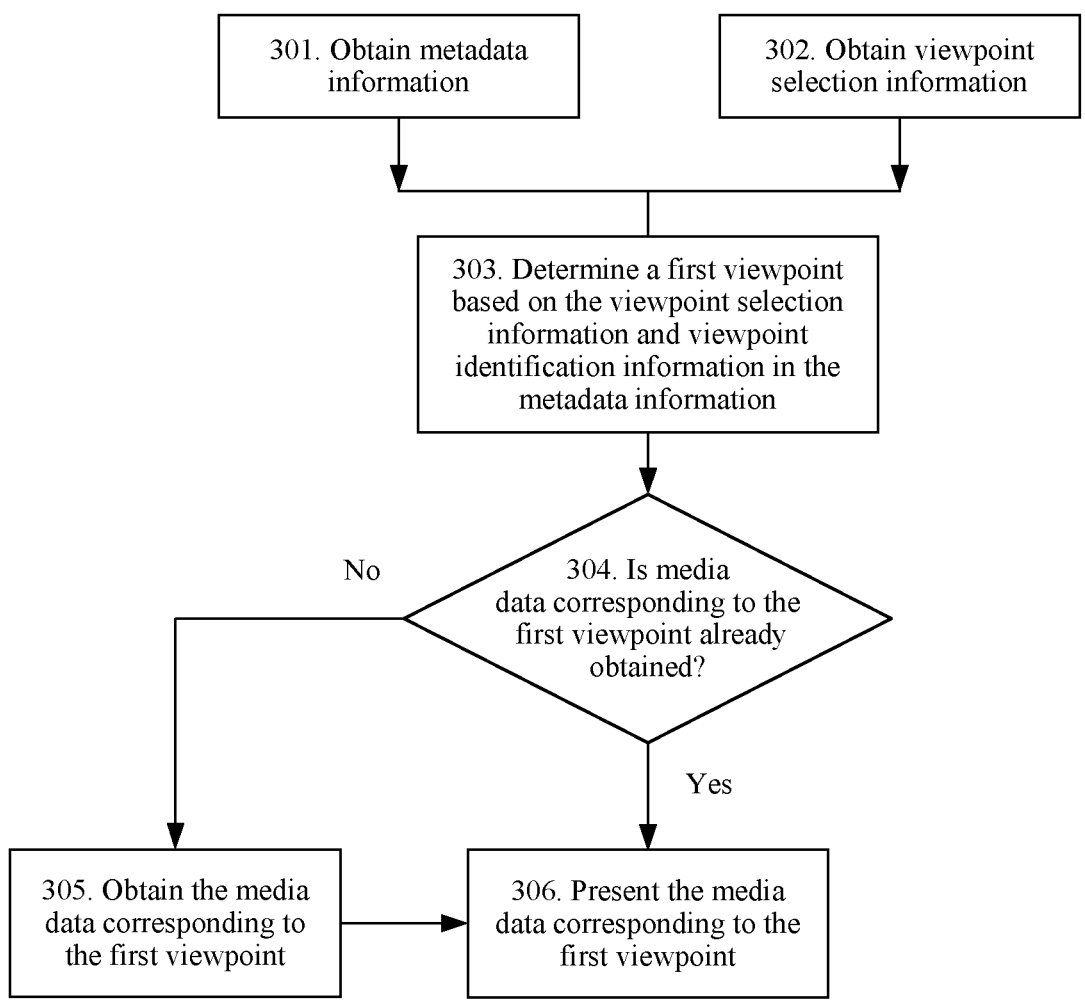
FIG. 4 is a flowchart of a media data processing method according to another embodiment of this application.

FIG. 4 is a flowchart of a media data processing method according to embodiments of this application. As with the method shown in FIG. 3, the method shown in FIG. 4 may also be performed by a decoding device.

The method shown in FIG. 4 includes steps 301 to 306. The following describes the steps 301 to 306 in detail.

301. Obtaining metadata information.

As with the metadata information obtained in step 101, the metadata information obtained in step 301 is attribute information that is used to describe media data. In addition, the metadata information obtained in step 301 may carry the viewpoint identification information, and the viewpoint identification information is used to indicate a viewpoint.

302. Obtaining viewpoint selection information.

The viewpoint selection information may be used to indicate a viewpoint that a user selects for watching. For example, when the method shown in FIG. 4 is performed by a terminal device, the user may enter the viewpoints selection information by using an operation interface of the terminal device, so as to select a viewpoint from which the user wants to watch a video.

Optionally, before step 302, the method shown in FIG. 4 further includes: presenting different viewpoints.

When the user sees the presented different viewpoints, the user may select, from the different viewpoints based on a need of watching a video, a target viewpoint for watching the video, and operates a display interface to generate viewpoint selection information.

303. Determining a first viewpoint based on the viewpoint selection information and viewpoint identification information in the metadata information.

When the method shown in FIG. 4 is performed by the terminal device, the terminal device may present different viewpoint icons (each viewpoint icon corresponds to a different piece of viewpoint identification information) on the display interface for the user to select. The user may click, based on a need, a viewpoint that needs to be used for watching (herein the click operation of the user is equivalent to the viewpoint selection information). Then, the device may present a video at the viewpoint selected by the user.

304. Determining whether media data corresponding to the first viewpoint is already obtained.

After it is determined in step 304 that the media data corresponding to the first viewpoint is already obtained, step 306 is directly performed. If it is determined in step 304 that the media data corresponding to the first viewpoint is not obtained, the media data corresponding to the first viewpoint needs to be first obtained; that is, step 305 is performed.

The media data corresponding to the first viewpoint is already obtained may mean that a client (i.e. a terminal device, e.g. a device that is capable of decoding and presenting media data) has locally downloaded the media data corresponding to the first viewpoint. The media data corresponding to the first viewpoint is not obtained may mean that only metadata information of the media data corresponding to the first viewpoint is obtained, but the media data corresponding to the first viewpoint has not been stored locally.

In this case, the client needs to continue to obtain, from a server side, the media data corresponding to the first viewpoint.

305. Obtaining the media data corresponding to the first viewpoint.

When the media data corresponding to the first viewpoint is being obtained, a bitstream of the media data corresponding to the first viewpoint may be obtained from the server side based on the metadata information of the media data corresponding to the first viewpoint. The bitstream of the media data corresponding to the first viewpoint is parsed, to obtain the media data corresponding to the first viewpoint.

306. Presenting the media data corresponding to the first viewpoint.

For example, when the media data corresponding to the first viewpoint is video data and the method shown in FIG. 4 is performed by the terminal device, the video corresponding to the first viewpoint may be displayed on a display screen of the terminal device. In this way, the user can watch the video corresponding to the first viewpoint.

Optionally, the foregoing viewpoint identification information may be carried in metadata information in different forms.

The viewpoint identification information may be carried in any one of: a media data track, a SEI, an MPD, and a timed metadata track.

That the viewpoint identification information is carried in the media data track, the SEI, or the MPD is described in detail below with reference to the following specific embodiments 1 to 14.

In addition to the semantics described in the following embodiments, for other semantics included in the MPD, reference may be made to explanations related to MPD semantics in standards such as OMAF and MPEG-DASH.

Embodiment 1

The viewpoint identification information is carried in the media data track.

A plurality of video streams (tracks) that belong to a same viewpoint may be added to one group, and a piece of viewpoint identification information (which may be a viewpoint ID) is allocated to each of groups including a plurality of video streams at different viewpoints. After parsing video stream groups of the viewpoints, the client presents the viewpoint IDs to a user, so that the user may select, based on the viewpoint IDs, a viewpoint that needs to be used for watching.

A group type box (TrackGroupTypeBox) is defined in a box in a media data track in an existing standard, and syntax included in the TrackGroupTypeBox is as follows:

aligned(8) class TrackGroupTypeBox(unsigned int(32) track_group_type) extends
FullBox(track_group_type, version=0, flags=0)
{
  unsigned int(32) track_group_id;
}

Semantics indicated by the syntax is as follows:
Track_group_type: indicates a group type;
track_group_id: indicates that tracks of a same type and with a same ID belong to a same group.

In Embodiment 1, a new group type box (ViewPointGroupBox) is added to the media data track, and the box is inherited from the TrackGroupTypeBox. Syntax of the new group type box is as follows:

aligned(8) class ViewPointGroupBox extends TrackGroupTypeBox('vipo') { }

Tracks that have the same value of track_group_id within TrackGroupTypeBox with track_group_type equal to 'vipo' belong to the same viewpoint. The track_group_id within TrackGroupTypeBox with track_group_type equal to 'vipo' is therefore used as the identifier of the viewpoint.

After obtaining the type box, the client parses the type box to obtain track_group_id in the box, and then presents different viewpoints to the user for the user to flexibly select.

Figure 5:
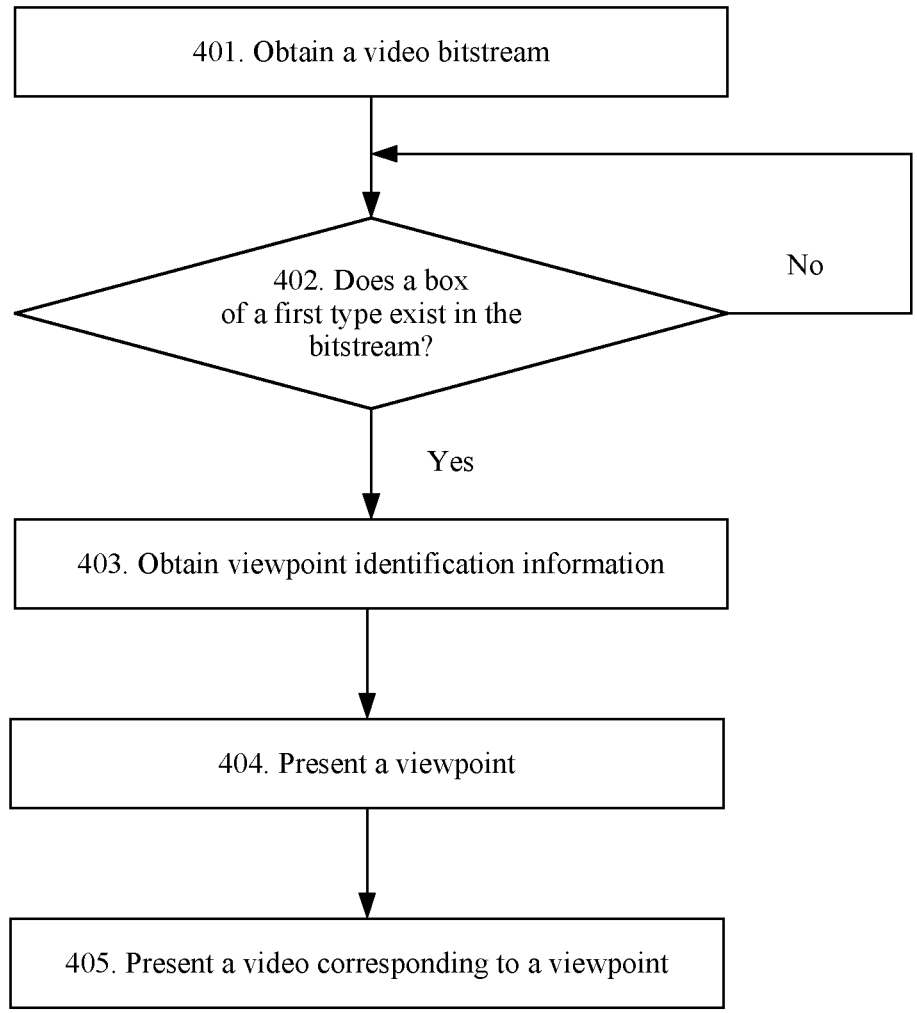
FIG. 5 is a flowchart of a media data processing method according to yet an embodiment of this application.

FIG. 5 is a flowchart of a media data processing method according to this embodiment of the application. A detailed process of processing the foregoing type box by the client may be shown in FIG. 5:

401. Obtaining a video bitstream.

402. Parsing the video bitstream, and determine whether a box of a specific type exists.

After the video bitstream is obtained, a TrackGroupTypeBox whose type is 'vipo' is searched for and parsed.

403. Obtaining viewpoint identification information.

When a TrackGroupTypeBox whose type is 'vipo' exists, track_group_id in the TrackGroupTypeBox is obtained, i.e., the viewpoint identification information is obtained.

404. Presenting a viewpoint to a user.

When a plurality of pieces of viewpoint identification information are obtained through parsing, viewpoints indicated by the plurality of pieces of viewpoint identification information may be presented as icons on a display interface of a device. For example, when three viewpoints are determined by using the viewpoint identification information, icons of the three viewpoints may be displayed on the display interface of the device. The user may select, on a display screen, a video at a corresponding viewpoint to watch. For example, the user may select the viewpoint by clicking an icon of the viewpoint.

405. Presenting a video corresponding to a viewpoint selected by the user.

For example, icons of a first viewpoint, a second viewpoint, and a third viewpoint are totally displayed on the display interface. When the user clicks the first viewpoint, the device may subsequently display, on the display interface, a video corresponding to the first viewpoint for the user to watch.

It should be understood that the foregoing 'vipo' indicates that a group type of a track group is a group of tracks belonging to a same viewpoint, and the viewpoint identification information is not carried in the box. The four characters "vipo" are only used herein to indicate a type of a group of tracks belonging to a same viewpoint, and the type of the group of tracks belonging to a same viewpoint may alternatively be indicated by using any other characters such as "aabb". Specific characters that are used are not limited in this application.

To ensure that different viewpoints have different track_group_id values, 1 may be assigned to flags of ViewPointGroupBox to indicate that different viewpoints have different track_group_id values. The box is defined as follows:

aligned(8) class ViewPointGroupBox extends TrackGroupTypeBox('vipo', version=0, flags=1) { }

Embodiment 2

The viewpoint identification information is carried in the SEI.

In a possible implementation, syntax of the viewpoint identification information carried in the SEI is as follows:

sei_payload(payloadType, payloadSize)
{
if(payloadType==VIP)
viewpoint_payload(payloadSize)
}

VIP in the above syntax is a specific value. For example, when VIP is 190, it indicates that a source_payload field in the SEI carries the viewpoint identification information, and syntax included in source_payload is as follows:

```
source_payload(payloadSize)
{
viewpoint_id
}
```

It should be understood that source_payload is the foregoing viewpoint_payload, and source_payload indicates detailed content in payload.

In the above, viewpoint_id describes ID information of a viewpoint to which a bitstream corresponding to the SEI belongs.

In addition, it should be understood that the value of the VIP is not limited in this application. When the VIP has a specific value, it may indicate that the source_payload field in the SEI carries the viewpoint identification information.

In Embodiment 2, after the client obtains a video bitstream, a detailed processing procedure is as follows:

(1) The client obtains the video bitstream, and parses NALU header information in the bitstream. If it is obtained through parsing that the header information is of an SEI type, the client parses an SEI NALU to obtain a payload type of the SEI.

(2) If the payload type (payloadType) of the SEI that is obtained by the client through parsing is 190, it indicates that viewpoint information of the bitstream is carried in the SEI, and the client continues to parse the payload to obtain view_position_id information and obtain a viewpoint number.

(3) The client presents, to a user, viewpoint numbers corresponding to different viewpoint_id values.

(4) The user selects a viewpoint for watching, and the client presents a video at the viewpoint to the user.

In the foregoing procedure from (1) to (4), the user may flexibly select, based on the viewpoint numbers presented by the client, videos at different viewpoints to watch.

Optionally, the metadata information further includes viewpoint position information, and the viewpoint position information is used to indicate a position of a viewpoint in a three-dimensional coordinate system.

In this application, different viewpoint positions can be flexibly indicated by using the viewpoint position information, so that the user can flexibly switch between different viewpoints when watching a video.

In this application, the viewpoint identification information may indicate a viewpoint ID or a viewpoint number. The viewpoint position information may be used to indicate the position of a viewpoint in the three-dimensional coordinate system. This means that, the viewpoint ID is indicated by using one piece of information, and the position of the viewpoint is indicated by using another piece of information.

Optionally, the viewpoint position information included in the metadata information may indicate a viewpoint position corresponding to the metadata information, and a position of one viewpoint in a sphere of another viewpoint may be calculated by using position information of each viewpoint.

For example, when a video is being shot, there are cameras at a viewpoint 1 and a viewpoint 2. A position of the viewpoint 2 in a sphere region in which media data corresponding to the viewpoint 1 is located is calculated by using viewpoint position information included in metadata information of the viewpoint 1 and viewpoint position information included in metadata information of the viewpoint 2.

Figure 6:
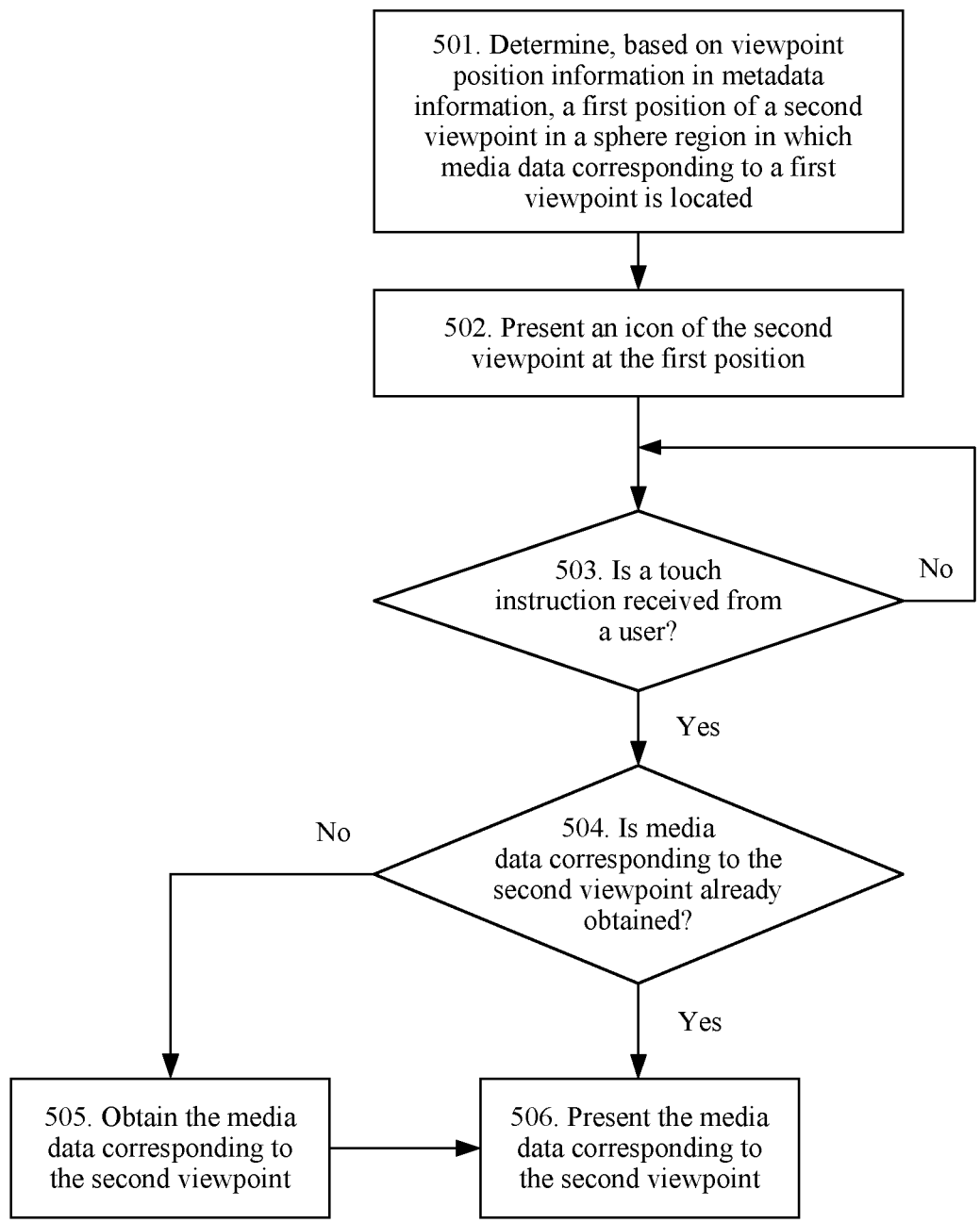
FIG. 6 is a flowchart of a media data processing method according to still an embodiment of this application.

FIG. 6 is a flowchart of a media data processing method according to this embodiment of the application. Specific steps in the method shown in FIG. 6 may be considered as a continuation of step 306 in the method shown in FIG. 4. After the media data corresponding to the first viewpoint is presented, based on the viewpoint position information, an icon of another viewpoint may further be presented at a position at which the media data of the first viewpoint is located, so that a user can flexibly switch from the first viewpoint to the another viewpoint. The method shown in FIG. 6 includes step 501 to step 506. The following separately describes step 501 to step 506 in detail.

501. Determining, based on the viewpoint position information, a first position of a second viewpoint in a sphere region in which the media data corresponding to the first viewpoint is located.

The viewpoint position information may be carried in the metadata information. Before step 501, the viewpoint position information may be first obtained from the metadata information.

It should be understood that in the method shown in FIG. 5, the viewpoint position information indicates a position of the second viewpoint in the sphere region in which the media data corresponding to the first viewpoint is located. The first position may be located in a region in which the first viewpoint and the second viewpoint overlap.

502. Presenting an icon of the second viewpoint at the first position.

The client may present the icon of the second viewpoint at the first position that is in a presented video at the first viewpoint, and the user may switch from the first viewpoint to the second viewpoint by clicking the icon of the second viewpoint. The click operation of the user herein is a viewpoint switching instruction.

503. Determining whether a viewpoint switching instruction is received from the user.

After receiving the viewpoint switching instruction from the user, the client performs step 504. If viewpoint switching instruction is not received, the client continues waiting.

504. Determining whether media data corresponding to the second viewpoint is already obtained.

The media data corresponding to the second viewpoint is already obtained may mean that the client has locally downloaded the media data corresponding to the second viewpoint. The media data corresponding to the second viewpoint is not obtained may mean that the client obtains only metadata information of the media data corresponding to the second viewpoint, but the media data corresponding to the second viewpoint has not been stored locally. In this case, the client needs to continue to obtain, from a server side, the media data corresponding to the second viewpoint.

After it is determined in step 504 that the media data corresponding to the second viewpoint is already obtained, step 506 is subsequently performed. If it is determined in step 504 that the media data corresponding to the second viewpoint is not obtained, the media data corresponding to the second viewpoint needs to be first obtained, and then is presented; that is, step 505 is first performed and then step 506 is performed.

505. Obtaining the media data corresponding to the second viewpoint.

When the media data corresponding to the second viewpoint is being obtained, a bitstream of the media data corresponding to the second viewpoint may be obtained from the server side based on the metadata information of the media data corresponding to the second viewpoint. Then, the bitstream of the media data corresponding to the second viewpoint is parsed, to obtain the media data corresponding to the second viewpoint.

506. Present the media data corresponding to the second viewpoint.

Optionally, the viewpoint position information may be carried in a timed metadata track, box information, an MPD, and SEI. The box information herein may be a box.

A scenario in which a viewpoint position change can be indicated by adding viewpoint position information to timed metadata track.

When the viewpoint position information is carried in a timed metadata track, the obtaining metadata information may include: obtaining the timed metadata track, where the timed metadata track includes the viewpoint position information.

When the viewpoint position information is carried in box information, the obtaining metadata information may include: obtaining the box information, where the box information includes the viewpoint position information.

When the viewpoint position information is carried in an MPD, the obtaining metadata information may include: obtaining the MPD, where the MPD includes the viewpoint position information.

When the viewpoint position information is carried in SEI, the obtaining metadata information may include: obtaining the SEI, where the SEI includes the viewpoint position information.

Because the timed metadata track, the box information, the MPD, and the SEI each include the viewpoint position information, a viewpoint can be determined by parsing the metadata track, the MPD, and the SEI.

Embodiment 3

The viewpoint identification information is carried in the MPD.

When the viewpoint identification information is carried in the MPD, the viewpoint identification information may be carried in a viewpoint descriptor of an adaptation set level field or a representation level field of the MPD.

A new descriptor @schemeIdUri may be defined in the viewpoint descriptor, to carry the viewpoint identification information. A value of the @schemeIdUri is "urn:mpeg:mpegI:omaf:2018:vwpt", and semantics of @schemeIdUri is a viewpoint identification information (VWPT) descriptor. The viewpoint identification information herein may also be referred to as viewpoint information. There is a maximum of one VWPT in the adaptation set level field or the representation level field of the MPD. A value of the VWPT descriptor is a string that is separated by a comma, and a specific value and a semantic definition of the VWPT descriptor are shown in Table 1.

TABLE 1

| @value parameter for VWPT descriptor | Use | Description |
| --- | --- | --- |
| viewpoint_id | M | Indicates the ID of the viewpoint. |

In Table 1, M represents a mandatory parameter, and viewpoint_id indicates the ID of the viewpoint.

It should be understood that adaptation sets having a same viewpoint_id value belong to a same viewpoint, and adaptation sets of different viewpoints have different viewpoint_id values.

In a possible implementation, when the viewpoint identification information is carried in the MPD, syntax included in the MPD is as follows:

```xml
<?xml version="1.0" encoding="UTF-8"?>
<MPD
  xmlns="urn:mpeg:dash:schema:mpd:2011"
  type="static"
  mediaPresentationDuration="PT10S"
  minBufferTime="PT1S"
  profiles="urn:mpeg:dash:profile:isoff-on-demand:2011">
  <Period>
    <!--viewpoint 1, Tile 1 -->
    <AdaptationSet segmentAlignment="true" subsegmentAlignment="true"
    subsegmentStartsWithSAP="1" >
      <EssentialProperty schemeIdUri="urn:mpeg:dash:srd:2014"
      value="0,0,0,960,1080,3840,2160"/>
      <Representation mimeType="video/mp4" codecs="avc1.42c00d"
      width="960" height="1080" bandwidth="79707" startWithSAP="1">
        <EssentialProperty schemeIdUri="urn:mpeg:mpegB:cicp:PF" value="0"/>
        <Viewpoint schemeIdUri="urn:mpeg:mpegI:omaf:2018:vwpt" value="1"
        />
<BaseURL> tile1.mp4</BaseURL>
        <SegmentBase indexRangeExact="true" indexRange="837-988"/>
      </Representation>
    </AdaptationSet>
<!-- viewpoint 1,Tile 2 -->
    <AdaptationSet segmentAlignment="true" subsegmentAlignment="true"
    subsegmentStartsWithSAP="1" >
      <EssentialProperty schemeIdUri="urn:mpeg:dash:srd:2014"
      value="0,960,0,960,1080,3840,2160"/>
      <Representation mimeType="video/mp4" codecs="avc1.42c00d"
      width="640" height="720" bandwidth="79707" startWithSAP="1">
        <EssentialProperty schemeIdUri="urn:mpeg:mpegB:cicp:PF" value="0"/>
        <Viewpoint schemeIdUri="urn:mpeg:mpegI:omaf:2018:vwpt" value="1" />
          <BaseURL> tile2.mp4</BaseURL>
          <SegmentBase indexRangeExact="true" indexRange="837-988"/>
        </Representation>
    </AdaptationSet>
<!--viewpoint 2, Tile 1-->
```

```xml
    <AdaptationSet segmentAlignment="true" subsegmentAlignment="true"
    subsegmentStartsWithSAP="1" >
      <EssentialProperty schemeIdUri="urn:mpeg:dash:srd:2014"
      value="0,0,0,960,1080,3840,2160"/>
      <Representation mimeType="video/mp4" codecs="avc1.42c00d"
      width="960" height="1080" bandwidth="79707" startWithSAP="1">
        <EssentialProperty schemeIdUri="urn:mpeg:mpegB:cicp:PF" value="0"/>
        <Viewpoint schemeIdUri="urn:mpeg:mpegI:omaf:2018:vwpt" value="2" />
        <BaseURL> tile1.mp4</BaseURL>
        <SegmentBase indexRangeExact="true" indexRange="837-988"/>
      </Representation>
    </AdaptationSet>
<!-- viewpoint 2,Tile 2 -->
    <AdaptationSet segmentAlignment="true" subsegmentAlignment="true"
    subsegmentStartsWithSAP="1" >
      <EssentialProperty schemeIdUri="urn:mpeg:dash:srd:2014"
      value="0,960,0,960,1080,3840,2160"/>
      <Representation mimeType="video/mp4" codecs="avc1.42c00d"
      width="640" height="720" bandwidth="79707" startWithSAP="1">
        <EssentialProperty schemeIdUri="urn:mpeg:mpegB:cicp:PF" value="0"/>
        <Viewpoint schemeIdUri="urn:mpeg:mpegI:omaf:2018:vwpt" value="2" />
        <BaseURL> tile2.mp4</BaseURL>
        <SegmentBase indexRangeExact="true" indexRange="837-988"/>
      </Representation>
    </AdaptationSet>
  </Period>
</MPD>
```

In the syntax included in the MPD, a total of two viewpoints are described: a viewpoint 1 and a viewpoint 2. When <Viewpoint schemeIdUri="urn:mpeg:mpegI:omaf:2018:vwpt" value="1"/> appears, it indicates the viewpoint 1. When <Viewpoint schemeIdUri="urn:mpeg:mpegI:omaf:2018:vwpt" value="2"/> appears, it indicates the viewpoint 2. The viewpoint 1 and the viewpoint 2 each have two tracks: Tile 1 and Tile 2.

After the client obtains an MPD file including the syntax, a detailed processing procedure of the client is as follows:

(1) The client parses an attribute at an adaptation set level, and obtains a viewpoint descriptor and an attribute value of the viewpoint descriptor.

(2) The client presents different viewpoint information to a user based on attribute values of different viewpoint descriptors.

(3) When the user selects a viewpoint for watching, the client presents, to the user, a video stream belonging to the viewpoint. In this process, the user can switch to a different viewpoint at any time for watching.

Embodiment 4

The viewpoint position information is carried in box information in a media data track.

Based on Embodiment 1, the viewpoint position information may be further added to ViewPointGroupBox, and the viewpoint position information may be used to describe absolute position information of a viewpoint in a three-dimensional spatial coordinate system. It should be understood that Embodiment 4 is applicable to a multi-camera 360-degree panoramic video application scenario with fixed viewpoint positions.

A new group type may be added to ViewPointGroupBox, to indicate that tracks with a same ID in the group type belong to a same viewpoint. The new group type is defined as follows:

aligned(8) class ViewPointGroupBox extends TrackGroupTypeBox('vipo')
{
unsigned int(1) static_position_flag;
bit(7) reserved=0;
if(staticposition_flag==1)
{
signed int(32) center_x;
signed int(32) center_y;
signed int(32) center_z;
}
}
Semantics of fields in the new group type is as follows:

static_position_flag: indicates whether the viewpoint position is static or dynamic;

center_x, center_y, and center_z: indicate an absolute position of a viewpoint center in a three-dimensional spatial coordinate system.

Specifically, center_x indicates a value of the viewpoint center on an x-axis in the three-dimensional coordinate system; center_y indicates a value of the viewpoint center on a y-axis in the three-dimensional coordinate system; and center_z indicates a value of the viewpoint center on a z-axis in the three-dimensional coordinate system. In addition, center_x, center_y, and center_z may be in a unit of millimeters or in a unit of $2^{-32}$.

When a value of static_position_flag is 1, it indicates that the viewpoint position is static. When a value of static_position_flag is 0, it indicates that the viewpoint position is dynamic.

In Embodiment 4, after the client obtains a video bitstream, a detailed processing procedure is as follows:

(1) The client obtains a video data track stream.

(2) The client searches the video data track stream for and parses a TrackGroupTypeBox whose type is 'vipo'.

(3) If a TrackGroupTypeBox whose type is 'vipo' exists in the video data track stream, obtain track_group_id of the video data track stream from the TrackGroupTypeBox. (That is, the client obtains the viewpoint identification information from the TrackGroupTypeBox).

(4) The client obtains absolute position information of a viewpoint in ViewPointGroupBox.

(5) The client presents a video at a viewpoint, and presents information about another viewpoint and a sphere region of the another viewpoint in the video at the viewpoint; and a user may click the region to switch to a different viewpoint for watching.

It should be understood that the client may obtain, based on ViewPointGroupBox, absolute position information of different viewpoints, and then obtain a relative position relationship between a plurality of viewpoints based on the absolute position information of the different viewpoints.

Embodiment 5

The viewpoint position information is carried in the SEI.

In addition to the viewpoint identification information, the SEI may carry the viewpoint position information. As with Embodiment 2, syntax of the viewpoint identification information carried in the SEI in Embodiment 5 is as follows:
sei_payload(payloadType, payloadSize)
{
if(payloadType==VIP)
View_position_payload(payloadSize)
}

VIP in the syntax is a specific value. For example, the VIP may be 190. It should be understood that the value of the VIP is not limited in this application. When the VIP has a specific value, it may indicate that a source_payload field in the SEI carries the viewpoint position information.

When a payload type (payloadType) of the SEI is VIP, syntax included in source_payload is as follows:
source_payload(payloadSize)
{
viewpoint_id
static_position_flag
    If(staticposition_flag==1)
{
center_x
center_y
center_z
}
}

In the above, viewpoint_id describes ID information of a viewpoint to which a bitstream described by the SEI belongs; static_position_flag indicates whether the viewpoint position is static or dynamic; and center_x, center_y, and center_z are used to indicate an absolute position of a viewpoint center in a three-dimensional spatial coordinate system.

In Embodiment 5, after the client obtains a video bitstream, a processing procedure is as follows:

(1) The client obtains the video bitstream, and parses NALU header information in the bitstream.

(2) If the client obtains, through parsing, that the header information is of an SEI type, the client continues to parse an SEI NALU to obtain a payload type of the SEI.

(3) If the payload type obtained by the client through parsing is 190, it indicates that viewpoint information of the bitstream is carried in the SEI, and the client continues to parse the bitstream to obtain view_position_id information and obtain a viewpoint number.

(4) The client continues to parse static_position_flag information; and if static_position_flag is 1, the client continues to parse center_x, center_y, and center_z to obtain the viewpoint position information.

(5) The client presents different viewpoint information to a user based on different viewpoint_id values.

(6) When the user selects a viewpoint for watching, the client presents, to the user, a bitstream belonging to the viewpoint. In this process, the user may obtain information about relative positions between viewpoints from calculated position information of a plurality of viewpoints, so as to switch to a different viewpoint at any time for watching.

Embodiment 6

The viewpoint position information is carried in the MPD.

The MPD may carry not only the viewpoint identification information, but also the viewpoint position information. As with Embodiment 3, in Embodiment 6, the viewpoint identification information may also be carried in a viewpoint descriptor of an adaptation set level field or a representation level field of the MPD. Similarly, the viewpoint position information may also be carried in the viewpoint descriptor of the adaptation set level field or the representation level field of the MPD.

To add the viewpoint position information to the viewpoint descriptor, a new descriptor @schemeIdUri needs to be defined as the viewpoint descriptor. A value of @schemeIdUri is "urn:mpeg:mpegI:omaf:2018:vwpt", and semantics of @schemeIdUri is a viewpoint information (VWPT) descriptor. In addition, there is a maximum of one VWPT in the adaptation set level field or the representation level field of the MPD. A value of the VWPT descriptor is a string that is separated by a comma, and a specific value and a semantic definition of the VWPT descriptor are shown in Table 2.

TABLE 2

| @value parameter for VWPT | Use | Description |
| --- | --- | --- |
| View_position_id | M | Indicates an ID of a viewpoint. |
| position_type | M | Indicates whether the viewpoint position is a dynamic position or a static position. When a value is 0, it indicates that the viewpoint position is static; or when a value is 1, it indicates that the viewpoint position is dynamic. |
| center_x | O | Indicates a value of a viewpoint center on an x-axis in a three-dimensional coordinate system. |
| center_y | O | Indicates a value of the viewpoint center on a y-axis in the three-dimensional coordinate system. |
| center_z | O | Indicates a value of the viewpoint center on a z-axis in the three-dimensional coordinate system. |

In Table 2, M represents a mandatory parameter, and O represents an optional parameter. In addition, center_x, center_y and center_z may be in a unit of millimeters or in a unit of $2^{-32}$. Alternatively, a position_id can be added, as shown in Table 3.

TABLE 3

| @value parameter for VWPT | Use | Description |
| --- | --- | --- |
| View_position_id | M | Indicates an ID of a viewpoint. |
| position_type | M | Indicates whether the viewpoint position is a dynamic position or a static position. When a value is 0, it indicates that the viewpoint position is static; or when a value is 1, it indicates that the viewpoint position is dynamic. |

TABLE 3-continued

| @value parameter for VWPT | Use | Description |
|---|---|---|
| center_x | O | Indicates a value of a viewpoint center on an x-axis in a three-dimensional coordinate system. |
| center_y | O | Indicates a value of the viewpoint center on a y-axis in the three-dimensional coordinate system. |
| center_z | O | Indicates a value of the viewpoint center on a z-axis in the three-dimensional coordinate system. |
| Position_id | O | Indicates an ID value of a representation. The representation describes position information of a viewpoint by using a timed metadata track. |

In Table 3, when position_type is 0, which indicates that the viewpoint position is static, a static viewpoint may be indicated by center_x, center_y, and center_z. When position_type is 1, which indicates that the viewpoint position is a dynamic position, the viewpoint may be described by using a specific timed metadata track. The timed metadata track may be associated with a current media track by using @associationId attribute. A value of @associationId of the timed metadata track is an @id value of a representation of the media track, and a common association type @associationType is 'cdsc'.

It should be understood that adaptation sets having a same viewpoint_id value belong to a same viewpoint, and adaptation sets of different viewpoints have different viewpoint_id values.

In a possible implementation, when the viewpoint identification information and the viewpoint position information are carried in the MPD, syntax included in the MPD is as follows:

```
<?xml version="1.0" encoding="UTF-8"?>
<MPD
  xmlns="urn:mpeg:dash:schema:mpd:2011"
  type="static"
  mediaPresentationDuration="PT10S"
  minBufferTime="PT1S"
  profiles="urn:mpeg:dash:profile:isoff-on-demand:2011">
  <Period>
    <!—viewpoint 1, Tile 1 -->
    <AdaptationSet segmentAlignment="true" subsegmentAlignment="true" subsegmentStartsWithSAP="1" >
      <EssentialProperty schemeIdUri="urn:mpeg:dash:srd:2014" value="0,0,0,960,1080,3840,2160"/>
      <Representation mimeType="video/mp4" codecs="avc1.42c00d" width="960" height="1080" bandwidth="79707" startWithSAP="1">
        <EssentialProperty schemeIdUri="urn:mpeg:mpegB:cicp:PF" value="0"/>
      <Viewpoint schemeIdUri="urn:mpeg:mpegI:omaf:2018:vwpt" value="1,0,0,0,0" />
        <BaseURL> tile1.mp4</BaseURL>
        <SegmentBase indexRangeExact="true" indexRange="837-988"/>
      </Representation>
    </AdaptationSet>
    <!-- viewpoint 1,Tile 2 -->
    <AdaptationSet segmentAlignment="true" subsegmentAlignment="true" subsegmentStartsWithSAP="1" >
      <EssentialProperty schemeIdUri="urn:mpeg:dash:srd:2014" value="0,960,0,960,1080,3840,2160"/>
      <Representation mimeType="video/mp4" codecs="avc1.42c00d" width="640" height="720" bandwidth="79707" startWithSAP="1">
        <EssentialProperty schemeIdUri="urn:mpeg:mpegB:cicp:PF" value="0"/>
      <Viewpoint schemeIdUri="urn:mpeg:mpegI:omaf:2018:vwpt" value="1,0,0,0,0" />
        <BaseURL> tile2.mp4</BaseURL>
        <SegmentBase indexRangeExact="true" indexRange="837-988"/>
      </Representation>
    </AdaptationSet>
    <!—viewpoint 2, Tile 1 -->
    <AdaptationSet segmentAlignment="true" subsegmentAlignment="true" subsegmentStartsWithSAP="1" >
      <EssentialProperty schemeIdUri="urn:mpeg:dash:srd:2014" value="0,0,0,960,1080,3840,2160"/>
      <Representation mimeType="video/mp4" codecs="avc1.42c00d" width="960" height="1080" bandwidth="79707" startWithSAP="1">
        <EssentialProperty schemeIdUri="urn:mpeg:mpegB:cicp:PF" value="0"/>
      <Viewpoint schemeIdUri="urn:mpeg:mpegI:omaf:2018:vwpt" value="2,0,100,100,100" />
        <BaseURL> tile1.mp4</BaseURL>
        <SegmentBase indexRangeExact="true" indexRange="837-988"/>
      </Representation>
    </AdaptationSet>
    <!-- viewpoint 2,Tile 2 -->
    <AdaptationSet segmentAlignment="true" subsegmentAlignment="true" subsegmentStartsWithSAP="1" >
      <EssentialProperty schemeIdUri="urn:mpeg:dash:srd:2014" value="0,960,0,960,1080,3840,2160"/>
      <Representation mimeType="video/mp4" codecs="avc1.42c00d" width="640" height="720" bandwidth="79707" startWithSAP="1">
        <EssentialProperty schemeIdUri="urn:mpeg:mpegB:cicp:PF" value="0"/>
      <Viewpoint schemeIdUri="urn:mpeg:mpegI:omaf:2018:vwpt"
```

-continued

```
value="2,0,100,100,100" />
      <BaseURL> tile2.mp4</BaseURL>
      <SegmentBase indexRangeExact="true" indexRange="837-988"/>
    </Representation>
  </AdaptationSet>
 </Period>
</MPD>
```

In the above syntax included in the MPD, a total of two viewpoints are described: viewpoint 1 and viewpoint 2. The viewpoint 1 and the viewpoint 2 each have two tracks: Tile 1 and Tile 2.

<Viewpoint schemeIdUri="urn:mpeg:mpegI:omaf:2018:vwpt" value="1, 0, 0, 0, 0"!> indicates the viewpoint 1, and a position of the viewpoint 1 in the three-dimensional coordinate system is (0, 0, 0).

<Viewpoint schemeIdUri="urn:mpeg:mpegI:omaf:2018:vwpt" value="2, 0, 100, 100, 100"> indicates the viewpoint 2, and a position of the viewpoint 2 in the three-dimensional coordinate system is (100, 100, 100).

In Embodiment 6, after the client obtains an MPD file including the syntax, a detailed processing procedure of the client is as follows:

(1) The client parses an attribute at an adaptation set level, and obtains a viewpoint descriptor and an attribute value of the viewpoint descriptor.

(2) The client presents different viewpoint information to a user based on attribute values of different viewpoint descriptors.

(3) When the user selects a viewpoint for watching, the client presents, to the user, a video stream belonging to the viewpoint, and the user may obtain information about relative positions between viewpoints calculated from position information of a plurality of viewpoints, so as to switch to a different viewpoint at any time for watching.

It should be understood that when the viewpoint position information is carried in the MPD, whether the viewpoint position is a static position or a dynamic position may be further considered. The following describes how the MPD carries the viewpoint position information when the viewpoint position is separately static and dynamic in detail with Embodiment 7 and Embodiment 8.

Embodiment 7

The viewpoint identification information and the viewpoint position information are carried in the MPD (the viewpoint position is a static position).

The MPD may carry not only the viewpoint identification information, but also the viewpoint position information. in Embodiment 7, the viewpoint identification information and the viewpoint position information may be carried in a viewpoint descriptor of an adaptation set level field or a representation level field of the MPD.

To add the viewpoint position information to the viewpoint descriptor, new @schemeIdUri needs to be defined in the viewpoint descriptor. A value of @schemeIdUri is "urn:mpeg:mpegI:omaf:2018:vwpt", and semantics of @schemeIdUri is a viewpoint information (VWPT) descriptor. schemeIdUri is used to describe a static viewpoint position. In addition, there is a maximum of one VWPT in the adaptation set level field or the representation level field of the MPD. A value of the VWPT descriptor is a string that is separated by a comma, and a specific value and a semantic definition of the VWPT descriptor are shown in Table 4.

TABLE 4

| @value parameter for VWPT | Use | Description |
| --- | --- | --- |
| View_position_id | M | Indicates an ID of a viewpoint. |
| center_x | M | Indicates a value of a viewpoint center on an x-axis in a three-dimensional coordinate system. |
| center_y | M | Indicates a value of the viewpoint center on a y-axis in the three-dimensional coordinate system. |
| center_z | M | Indicates a value of the viewpoint center on a z-axis in the three-dimensional coordinate system. |

In Table 4, M represents a mandatory parameter, and center_x, center_y, and center_z may be in a unit of millimeters or in a unit of $2^{-32}$.

It should be understood that adaptation sets having a same viewpoint_id value belong to a same viewpoint, and adaptation sets of different viewpoints have different viewpoint_id values.

In a possible implementation, when the viewpoint identification information and the viewpoint position information are carried in the MPD, syntax included in the MPD is as follows:

```
<?xml version="1.0" encoding="UTF-8"?>
<MPD
  xmlns="urn:mpeg:dash:schema:mpd:2011"
  type="static"
  mediaPresentationDuration="PT10S"
  minBufferTime="PT1S"
  profiles="urn:mpeg:dash:profile:isoff-on-demand:2011">
  <Period>
    <!--viewpoint 1, Tile 1 -->
    <AdaptationSet segmentAlignment="true" subsegmentAlignment="true"
subsegmentStartsWithSAP="1" >
      <EssentialProperty schemeIdUri="urn:mpeg:dash:srd:2014"
value="0,0,0,960,1080,3840,2160"/>
      <Representation mimeType="video/mp4" codecs="avc1.42c00d"
width="960" height="1080" bandwidth="79707" startWithSAP="1">
        <EssentialProperty schemeIdUri="urn:mpeg:mpegB:cicp:PF" value="0"/>
```

```
        <Viewpoint schemeIdUri="urn:mpeg:mpegI:omaf:2018:vwpt" value="1,0,0,0"
/>
            <BaseURL> tile1.mp4</BaseURL>
            <SegmentBase indexRangeExact="true" indexRange="837-988"/>
        </Representation>
    </AdaptationSet>
    <!-- viewpoint 1,Tile 2 -->
    <AdaptationSet segmentAlignment="true" subsegmentAlignment="true"
subsegmentStartsWithSAP="1" >
        <EssentialProperty schemeIdUri="urn:mpeg:dash:srd:2014"
value="0,960,0,960,1080,3840,2160"/>
        <Representation mimeType="video/mp4" codecs="avc1.42c00d"
width="640" height="720" bandwidth="79707" startWithSAP="1">
            <EssentialProperty schemeIdUri="urn:mpeg:mpegB:cicp:PF" value="0"/>
        <Viewpoint schemeIdUri="urn:mpeg:mpegI:omaf:2018:vwpt" value="1,0,0,0"
/>
            <BaseURL> tile2.mp4</BaseURL>
            <SegmentBase indexRangeExact="true" indexRange="837-988"/>
        </Representation>
    </AdaptationSet>
    <!—viewpoint 2, Tile 1 -->
    <AdaptationSet segmentAlignment="true" subsegmentAlignment="true"
subsegmentStartsWithSAP="1" >
        <EssentialProperty schemeIdUri="urn:mpeg:dash:srd:2014"
value="0,0,0,960,1080,3840,2160"/>
        <Representation mimeType="video/mp4" codecs="avc1.42c00d"
width="960" height="1080" bandwidth="79707" startWithSAP="1">
            <EssentialProperty schemeIdUri="urn:mpeg:mpegB:cicp:PF" value="0"/>
        <Viewpoint schemeIdUri="urn:mpeg:mpegI:omaf:2018:vwpt"
value="2,100,100,100" />
            <BaseURL> tile1.mp4</BaseURL>
            <SegmentBase indexRangeExact="true" indexRange="837-988"/>
        </Representation>
    </AdaptationSet>
    <!-- viewpoint 2,Tile 2 -->
    <AdaptationSet segmentAlignment="true" subsegmentAlignment="true"
subsegmentStartsWithSAP="1" >
        <EssentialProperty schemeIdUri="urn:mpeg:dash:srd:2014"
value="0,960,0,960,1080,3840,2160"/>
        <Representation mimeType="video/mp4" codecs="avc1.42c00d"
width="640" height="720" bandwidth="79707" startWithSAP="1">
            <EssentialProperty schemeIdUri="urn:mpeg:mpegB:cicp:PF" value="0"/>
        <Viewpoint schemeIdUri="urn:mpeg:mpegI:omaf:2018:vwpt"
value="2,100,100,100" />
            <BaseURL> tile2.mp4</BaseURL>
            <SegmentBase indexRangeExact="true" indexRange="837-988"/>
        </Representation>
    </AdaptationSet>
  </Period>
</MPD>
```

In the syntax included in the MPD, a total of two viewpoints are described: viewpoint 1 and viewpoint 2. The viewpoint 1 and the viewpoint 2 each have two tracks: Tile 1 and Tile 2.

<Viewpoint schemeIdUri="urn:mpeg:mpegI:omaf:2018:vwpt" value="1, 0, 0, 0, 0"!> indicates the viewpoint 1, and a position of the viewpoint 1 in the three-dimensional coordinate system is (0, 0, 0).

<Viewpoint schemeIdUri="urn:mpeg:mpegI:omaf:2018:vwpt" value="2, 0, 100, 100, 100"> indicates the viewpoint 2, and a position of the viewpoint 2 in the three-dimensional coordinate system is (100, 100, 100).

In Embodiment 7, after the client obtains an MPD file including the syntax, a detailed processing procedure of the client is as follows:

(1) The client parses an attribute at an adaptation set level, and obtains a viewpoint descriptor and an attribute value of the viewpoint descriptor.

(2) The client presents different viewpoint information to a user based on attribute values of different viewpoint descriptors.

(3) When the user selects a viewpoint for watching, the client presents, to the user, a video stream belonging to the viewpoint, and the user may obtain information about relative positions between viewpoints calculated from position information of a plurality of viewpoints, so as to switch to a different viewpoint at any time for watching.

Embodiment 8

The viewpoint identification information and the viewpoint position information are carried in the MPD (the viewpoint position is a dynamic position).

The MPD may carry not only the viewpoint identification information, but also the viewpoint position information. In Embodiment 8, the viewpoint identification information and the viewpoint position information may be carried in a viewpoint descriptor of an adaptation set level field or a representation level field of the MPD.

To add the viewpoint position information to the viewpoint descriptor, new @schemeIdUri needs to be defined in the viewpoint descriptor. A value of @schemeIdUri is "urn:mpeg:mpegI:omaf:2018:vwpt:dynamic", and semantics of @schemeIdUri is a viewpoint information (VWPT) descriptor. schemeIdUri is used to describe a dynamic viewpoint position. In addition, there is a maximum of one VWPT in the adaptation set level field or the representation level field of the MPD. A value of the VWPT descriptor is a string that is separated by a comma, and a specific value and a semantic definition of the VWPT descriptor are shown in Table 5.

TABLE 5

| @value parameter for VWPT descriptor | Use | Description |
|---|---|---|
| viewpoint_id | M | Indicates an ID of a viewpoint. |
| Position_id | M | Indicates an ID value of a representation. The representation describes position information of a viewpoint by using a timed metadata track. |

In Table 5, M represents a mandatory parameter.

In Embodiment 8, the viewpoint may be described by using a specific timed metadata track. The timed metadata track may be associated with a current media track by using @associationId attribute. A value of @associationId of the timed metadata track is an @id value of a representation of the media track, and a common association type @associationType is 'cdsc'.

In a possible implementation, when the viewpoint identification information and the viewpoint position information are carried in the MPD, syntax included in the MPD is as follows:

```
<?xml version="1.0" encoding="UTF-8"?>
<MPD
  xmlns="urn:mpeg:dash:schema:mpd:2011"
  type="static"
  mediaPresentationDuration="PT10S"
  minBufferTime="PT1S"
  profiles="urn:mpeg:dash:profile:isoff-on-demand:2011">
  <Period>
    <!--viewpoint 1, Tile 1 -->
    <AdaptationSet segmentAlignment="true" subsegmentAlignment="true"
subsegmentStartsWithSAP="1" >
      <EssentialProperty schemeIdUri="urn:mpeg:dash:srd:2014"
value="0,0,0,960,1080,3840,2160"/>
      <Representation id="tile1" mimeType="video/mp4" codecs="avc1.42c00d"
width="960" height="1080" bandwidth="79707" startWithSAP="1">
        <EssentialProperty schemeIdUri="urn:mpeg:mpegB:cicp:PF" value="0"/>
    <Viewpoint schemeIdUri="urn:mpeg:mpegI:omaf:2018:vwpt:dynamic"
value="1,m1" />
        <BaseURL> tile1.mp4</BaseURL>
        <SegmentBase indexRangeExact="true" indexRange="837-988"/>
      </Representation>
    </AdaptationSet>
    <!--timed metadata track -->
    <AdaptationSet segmentAlignment="true" subsegmentAlignment="true"
subsegmentStartsWithSAP="1" >
         <Representation id="m1" associationId="tile1" associationType="cdsc"
codecs="vpps">
       <BaseURL> viewpoint_position.mp4</BaseURL>
      </Representation>
    </AdaptationSet>
  </Period>
</MPD>
```

In the MPD, <Viewpoint schemeIdUri "urn:mpeg:mpegI:omaf:2018:vwpt:dynamic" value="1, m1"/> indicates that a viewpoint whose ID is 1 is associated with a timed metadata track whose ID is m1. The timed metadata track whose ID is m1 is used to indicate a position of the viewpoint whose ID is 1. viewpoint_position.mp4 in the timed metadata track includes the position of the viewpoint whose ID is 1. For a specific expression form, refer to the embodiment that describes a dynamic viewpoint position in this specification.

Embodiment 9

The viewpoint position information is carried in the timed metadata track.

In a multi-camera 360-degree panoramic video application scenario, a position of a viewpoint may change. In case a viewpoint position changes, the manner in Embodiment 9 may be used to carry the viewpoint position information.

Based on Embodiment 4, the viewpoint position information may be carried by a timed metadata track associated with track_group_id of the viewpoint identification information. An association relationship between track_group_id and the timed metadata track may be indicated using an association type 'cdsc' in a video stream.

A sample entry of the timed metadata track associated with track_group_id is defined as follows:

Class ViewpointPositionEntry extends MetaDataSampleEntry('vpps') { }

A sample format of the timed metadata track is defined as follows:

aligned(8) ViewpointPositionSample( )
{
signed int(32) center_x;
signed int(32) center_y;
signed int(32) center_z;
}

Wherein, center_x indicates a value of a viewpoint center on an x-axis in a three-dimensional coordinate system; center_y indicates a value of the viewpoint center on a y-axis in the three-dimensional coordinate system; and center_z indicates a value of the viewpoint center on a z-axis in the three-dimensional coordinate system. center_x, center_y, and center_z may be in a unit of millimeters or in a unit of $2^{-32}$.

In Embodiment 9, after a client obtains a video bitstream, a detailed processing procedure is as follows:

(1) The client obtains a video data track stream.

(2) The client searches the video data track stream for and parses a TrackGroupTypeBox whose type is 'vipo'.

(3) If the TrackGroupTypeBox whose type is 'vipo' exists in the video data track stream, the client inspects static_position_flag field of the video data track stream. If a value of the field is 1, the client obtains absolute position information of a viewpoint based on the procedure in Embodiment 4.

(4) If the static_position_flag field is not 1, the client obtains a timed metadata track.

(5) In the timed metadata tracks, the client searches for and parses a timed metadata track whose sample entry type is 'vpps' and that is associated with track_group_id by using an association type 'cdsc', and obtains viewpoint position information in sample data of the timed metadata track.

(6) The client obtains the timed metadata track of the type 'vpps', searches a plurality of media data tracks for media data associated with the timed metadata track, determines a viewpoint identifier of the media data, and then determines a viewpoint position corresponding to the viewpoint in the timed metadata track.

(7) When a user selects a viewpoint for watching, the client displays a bitstream belonging to the viewpoint.

In this process, the user may obtain information about relative positions between viewpoints calculated from position information of a plurality of viewpoints, so as to switch to a different viewpoint at any time for watching.

In Embodiment 9, for a media stream at each viewpoint, dynamic position information of the media stream may be described by using a timed metadata track associated with the media stream. When there are N (N is greater than or equal to 1) viewpoints, N timed metadata tracks are needed to describe position information of the N viewpoints.

Optionally, position information of all viewpoints may be further described by using one timed metadata track. A corresponding sample entry of the timed metadata track is defined as follows:

class ViewpointPositionEntry extends MetaDataSampleEntry('vpps')
{
Unsigned int(32) num_viewpoints;
}
A corresponding sample format is defined as follows:
aligned(8) ViewpointPositionSample( )
{
for(i=0;i<num_viewpoints;i++)
{
unsigned int(32) track_group_id;
signed int(32) center_x;
signed int(32) center_y;
signed int(32) center_z;
}
}
Semantics of the fields is as follows:
num_viewpoints: a quantity of viewpoints;
track_group_id: an ID of a viewpoint; and
center_x, center_y, and center_z: an absolute position of a center point of a viewpoint in a three-dimensional coordinate system, and may be in a unit of millimeters or in a unit of $2^{-32}$.

In Embodiment 9, a spatial position of the viewpoint is described by using a timed metadata track associated with media tracks, so that the user can switch, by clicking or by using a similar method, to another viewpoint for watching when watching a video at a viewpoint.

Embodiment 10

The viewpoint position information is carried in a sample group box in a media data track (the viewpoint position is a dynamic position).

In a multi-camera 360-degree panoramic video application scenario, a position of a viewpoint may change. In case a viewpoint position changes, a manner in Embodiment 10 may be used to carry the viewpoint position information.

In Embodiment 10, a sample group mechanism may be used to indicate positions of different viewpoints to which samples belong.

One video stream (or video track) may carry zero or one SampleToGroupBox whose group type (grouping_type) is 'vppo'. The SampleToGroupBox indicates viewpoint position information of a plurality of samples in the video stream, and the viewpoint position information may be a position of the viewpoint in a three-dimensional coordinate system.

To be specific, in Embodiment 10, a plurality of samples belonging to same viewpoint may be added to one sample group, and then the viewpoint to which the sample group belongs is indicated by using one piece of viewpoint position information.

When there is one SampleToGroupBox whose group type is 'vppo', there is also one SampleGroupDescriptionBox of the same group type, and the SampleGroupDescriptionBox carries a value of a position of a viewpoint to which this group of samples belongs.

A new sample group type may be defined as 'vppo', and the sample group type is named ViewPointPositionEntry. Detailed syntax of ViewPointPositionEntry is defined as follows:

class ViewPointPositionEntry( ) extends VisualSampleGroupEntry('vppo')
{
signed int(32) center_x;
signed int(32) center_y;
signed int(32) center_z;
}
center_x, center_y, and center_z indicate an absolute position of a viewpoint center in a three-dimensional coordinate system, and may be in a unit of millimeters or in a unit of $2^{-32}$.

In Embodiment 10, after a client obtains a video bitstream, a detailed processing procedure is as follows:

(1) The client obtains a video data track stream.

(2) The client searches the video data track stream for and parses a TrackGroupTypeBox whose type is 'vipo'.

(3) If a TrackGroupTypeBox whose type is 'vipo' exists in the video data track stream, view static_position_flag field of the video data track stream. If a value of the field is 1, obtain absolute position information of a viewpoint based on the procedure in Embodiment 4.

(4) If a value of the static_position_flag field is not 1, the client searches for a SampleToGroupBox whose type is 'vppo' and a SampleGroupDescriptionBox whose type is 'vppo', to obtain position information of viewpoints to which different samples belong.

(5) When a user selects a viewpoint for watching, the client displays a bitstream belonging to the viewpoint.

In this process, the user may obtain information about relative positions between viewpoints calculated from position information of a plurality of viewpoints, so as to switch to a different viewpoint at any time for watching.

In Embodiment 10, a spatial position of a viewpoint of a track in which the sample(s) is located is described by using a sample group entry, so that the user can switch, by clicking or by using a similar method, to another viewpoint for watching when watching a video at a viewpoint.

In addition to the viewpoint identification information, the metadata information may include recommended viewport information. The following describes including the recommended viewport in detail with reference to Embodiment 11 to Embodiment 14.

Embodiment 11

The timed metadata track carries the recommended viewport information and the viewpoint identification information.

Embodiment 11 describes an application scenario of a stream with a recommended viewport. In this scenario, a user does not watch a video by using a viewport and a viewpoint selected by the user, but watches a video based on a viewport and a viewpoint that are designed in advance or recommended by a director or a video producer.

In an existing OMAF standard, a syntax format of a stream with a recommended viewport is defined. When a viewport (in other words, a sphere region, also called a visual angle) recommended by the director to the user for watching is described by using a timed metadata track, a syntax format of a sample entry is defined as follows:

Class RcvpSampleEntry( ) extends SphereRegionSampleEntry('rcvp')
{
RcvpInfoBox( );
}
Class RcvpInfoBox extends FullBox('rvif', version=0, flags)
{
Unsigned int(8) viewport_type;
String viewport_description;
}

SphereRegionSampleEntry indicates a type of the sphere region viewport. viewport_type indicates the type of recommended viewport.

A corresponding sample format is as follows:
Aligned(8) SphereRegionStruct(range_included_flag)
{
Signed int(32) center_azimuth;
Signed int(32) center_elevation;
Signed int(32) center_tilt;
If(range_included_flag)
{
   Unsigned int(32) azimuth_range;
   Unsigned int(32) elevation_range;
}
Unsigned int(1) interpolate;
Bit(7) reserved=0;
}
Aligned(8) SphereRegionSample( )
{
For(i=0; i<num_regions; i++)
SphereRegionStruct(dynamic_range_flag)
}

In Embodiment 11, a new sample group is defined in the timed metadata track, to indicate a viewpoint to which a sample group in a timed metadata track of recommended viewport belongs.

A timed metadata track whose sample entry type is 'rcvp' may carry zero or one SampleToGroupBox whose group type (grouping_type) is 'vwpt'. The SampleToGroupBox indicates an ID of a viewpoint to which samples in the timed metadata track belong (which also indicates a viewpoint corresponding to the samples in a video track).

When there is one SampleToGroupBox whose group type is 'vwpt', there is also one SampleGroupDescriptionBox of the same group type, and the SampleGroupDescriptionBox carries a value of an ID of a viewpoint to which this group of samples belongs.

A sample group type is defined as follows:
class ViewpointEntry( ) extends SampleGroupDescriptionEntry('vwpt')
{
unsigned int(32) track_group_id;
}

In the above, track_group_id indicates an ID of a viewpoint.

In Embodiment 11, after the client obtains a video bitstream, a detailed processing procedure is as follows:

(1) The client obtains a video data track stream.

(2) The client searches the video data track stream for and parses a TrackGroupTypeBox whose type is 'vipo'. If a TrackGroupTypeBox exists, the client obtains track_group_id of the TrackGroupTypeBox.

(3) The client obtains a timed metadata track whose type is 'rcvp', parses information in a sample group of the timed metadata track, and determines the viewpoint of each sample.

(4) The client presents recommended viewport of different viewpoints to a user based on information in the timed metadata track.

In Embodiment 11, sample group information in a timed metadata track of a stream with a recommended viewport may be used to distinguish between samples belonging to different viewpoints.

Embodiment 12

A new type is defined in the timed metadata track to carry the viewpoint identification information.

Embodiment 12 also describes an application scenario of a stream with a recommended viewport. In an existing OMAF standard, a syntax format of a stream with a recommended viewport is defined. When a viewport recommended by the director to the user for watching is described by using a timed metadata track, a syntax format of a sample entry is defined as follows:

Class RcvpSampleEntry( ) extends SphereRegionSampleEntry('rcvp')
{
RcvpInfoBox( );
}
Class RcvpInfoBox extends FullBox('rvif', version=0, flags)
{
Unsigned int(8) viewport_type;
String viewport_description;
}

In the above, viewport_type indicates the type of recommended viewport.

A corresponding sample format is as follows:
Aligned(8) SphereRegionStruct(range_included_flag)
{
Signed int(32) center_azimuth;
Signed int(32) center_elevation;
Signed int(32) center_tilt;
If(range_included_flag)

```
{
    Unsigned int(32) azimuth_range;
    Unsigned int(32) elevation_range;
}
Unsigned int(1) interpolate;
Bit(7) reserved=0;
}
Aligned(8) SphereRegionSample( )
{
For(i=0; i<num_regions; i++)
SphereRegionStruct(dynamic_range_flag)
}
```

In Embodiment 12, a new type is defined in the timed metadata track, to indicate that a plurality of samples in a timed metadata track of a stream with a recommended viewport belong to a plurality of viewpoints, and IDs of the viewpoints to which the samples belong are added to a sample format.

A newly defined sample entry type may be as follows:
    class RcvpSampleWithVPSEntry( ) extends RcvpSampleEntry('rcvs') { }

A new sample syntax is as follows:
    class SphereRegionSampleWithVPS( ) extends SphereRegionSample( )
    {
    unsigned int(32) track_group_id;
    }

In the above, track_group_id indicates an ID of a viewpoint.

In Embodiment 12, after the client obtains a video bitstream, a detailed processing procedure is as follows:

(1) The client obtains a video data track stream.

(2) The client searches the video data track stream for and parses a TrackGroupTypeBox whose type is 'vipo'; and if a TrackGroupTypeBox exists, the client obtains track_group_id of the TrackGroupTypeBox.

(3) The client obtains a timed metadata track whose type is 'rcvs', parses information in a sample of the timed metadata track, and determines the viewpoint of each sample.

(4) The client presents recommended viewport of different viewpoints to a user based on information in the timed metadata track.

In Embodiment 12, the new type is defined in the timed metadata track. The type is inherited from the type 'rcvp' of the timed metadata track of the stream with a recommended viewport, and viewpoint information is added to the sample.

Embodiment 13

A new timed metadata track is defined to carry the viewpoint identification information.

Embodiment 13 is also applied to a scenario in which a recommended viewport exists. In Embodiment 13, a viewport (in other words, a sphere region) recommended by a director to the user for watching may be described by using a timed metadata track, and a syntax format of a sample entry is defined as follows:
    Class RcvpSampleEntry( ) extends SphereRegionSampleEntry('rcvp')
    {
    RcvpInfoBox( );
    }
    Class RcvpInfoBox extends FullBox('rvif', version=0, flags) {
    Unsigned int(8) viewport_type;
    String viewport_description;
    }

In the above, SphereRegionSampleEntry indicates a type of sphere region viewport, and viewport_type indicates the type of recommended viewport is recommended viewport.

A sample format is defined as follows:
```
Aligned(8) SphereRegionStruct(range_included_flag) {
Signed int(32) center_azimuth;
Signed int(32) center_elevation;
Signed int(32) center_tilt;
If(range_included_flag) {
Unsigned int(32) azimuth_range;
Unsigned int(32) elevation_range;
}
Unsigned int(1) interpolate;
Bit(7) reserved=0;
}
Aligned(8) SphereRegionSample( ) {
For(i=0; i<num_regions; i++)
SphereRegionStruct(dynamic_range_flag)
}
```

In Embodiment 13, the recommended viewport information is indicated by using one timed metadata track, and then an associated timed metadata track is defined to indicate ID information of a viewpoint.

By using a type 'cdsc', a timed metadata track of a stream with a recommended viewport may be associated with a timed metadata track that indicates ID information of a viewpoint, to describe information about a viewpoint to which each sample in the stream with a recommended viewport belongs.

A sample entry type is as follows:
    class ViewPointSampleEntry( ) extends MetaDataSampleEntry('vpos') {
    }

A sample syntax is as follows:
    aligned(8) ViewPointSample( )
    {
    unsigned int(32) view_point_id;
    }

In Embodiment 13, after the client obtains a video bitstream, a detailed processing procedure is as follows:

(1) The client obtains a video data track stream.

(2) The client searches the video data track stream for and parses a TrackGroupTypeBox whose type is 'vipo'. If a TrackGroupTypeBox exists, the client obtains track_group_id of the TrackGroupTypeBox.

(3) The client obtains a timed metadata track whose type is 'rcvp', and obtains track_id of the timed metadata track and recommended viewport information in a sample.

(4) The client obtains a timed metadata track whose type is 'vpos' and that is associated with track_id, and obtains viewpoint information in a sample of the timed metadata track.

(5) The client presents recommended viewport of different viewpoints to a user based on information in the timed metadata track.

In Embodiment 13, a new timed metadata track is defined; and the timed metadata track of the type is associated with a timed metadata track of a stream with a recommended viewport, to jointly indicate information about a viewpoint to which a recommended viewport belongs.

Embodiment 14

The timed metadata track is redefined to carry the viewpoint identification information.

In Embodiment 14, a viewport recommended by a director to the user for watching may be described by using a timed metadata track, and a syntax format of a sample entry is defined as follows:

Class RcvpSampleEntry( ) extends SphereRegionSampleEntry('rcvp')
{
RcvpInfoBox( );
}
Class RcvpInfoBox extends FullBox('rvif', version=0, flags) {
Unsigned int(8) viewport_type;
String viewport_description;
}
viewport_type indicates the type of recommended viewport.

A sample format is defined as follows:
Aligned(8) SphereRegionStruct(range_included_flag) {
Signed int(32) center_azimuth;
Signed int(32) center_elevation;
Signed int(32) center_tilt;
If(range_included_flag) {
Unsigned int(32) azimuth_range;
Unsigned int(32) elevation_range;
{
Unsigned int(1) interpolate;
Bit(7) reserved=0;
}
Aligned(8) SphereRegionSample( ) {
For(i=0; i<num_regions; i++)
SphereRegionStruct(dynamic_range_flag)
}

In Embodiment 14, semantics of the timed metadata track may be redefined, to describe a viewpoint and a viewport that are recommended by a director to the user for watching. An original type 'rcvp' of an OMAF stream with a viewport recommended by a director is still used for the definition of the sample entry, and a sample format is defined as:
  aligned(8) SphereRegionSample( ) {
  unsigned int(1) multiple_viewpoint_presence_flag;
  bit(7) reserved=0;
  if(multiple_viewpoint_presence_flag==1) {
  unsigned int(32) track_group_id;
  }
  For(i=0; i<num_regions; i++)
    SphereRegionStruct(dynamic_range_flag)
  }
}

In the above, multiple_viewpoint_presence_flag indicates whether a stream with viewport recommended by a director has a plurality of viewpoints; and track_group_id indicates an ID of a viewpoint if the stream with viewport recommended by a director has a plurality of viewpoints.

In Embodiment 14, after the client obtains a video bitstream, a detailed processing procedure is as follows:

(1) The client obtains a video data track stream.

(2) The client searches the video data track stream for and parses a TrackGroupTypeBox whose type is 'vipo', and if a TrackGroupTypeBox exists, the client obtains track_group_id of the TrackGroupTypeBox.

(3) The client obtains a timed metadata track whose type is 'rcvp', and analyzes sample data of the timed metadata track. If multiple_position_presence_flag is 1, the client obtains track_group_id of another viewpoint and its viewport recommended for watching.

(4) The client presents recommended viewport of different viewpoints to a user based on information in the timed metadata track.

The foregoing has described the media data processing method in the embodiments of this application in detail with reference to FIG. 1 to FIG. 6. The following describes a media data processing apparatus according to the embodiments of this application. It should be understood that media data processing apparatuses described in FIG. 7 and FIG. 8 can perform each step of the media data processing method in FIG. 1 to FIG. 6. Limitations on each step in FIG. 1 to FIG. 6 are also applicable to the apparatuses shown in FIG. 7 and FIG. 8. Therefore, for brevity, repeated descriptions are appropriately omitted when the apparatuses shown in FIG. 7 and FIG. 8 are described.

Figure 7:
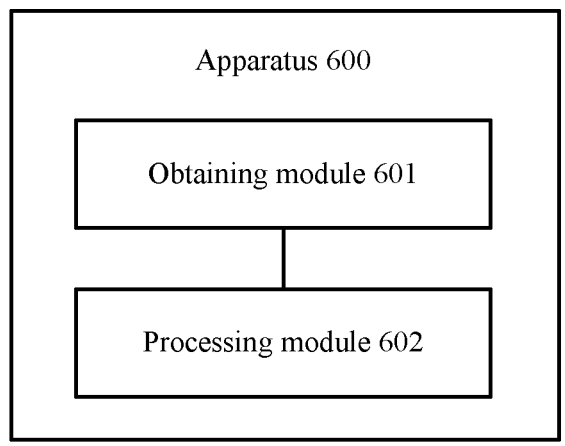
FIG. 7 is a simplified block diagram of a media data processing apparatus according to an embodiment of this application.
Figure 8:
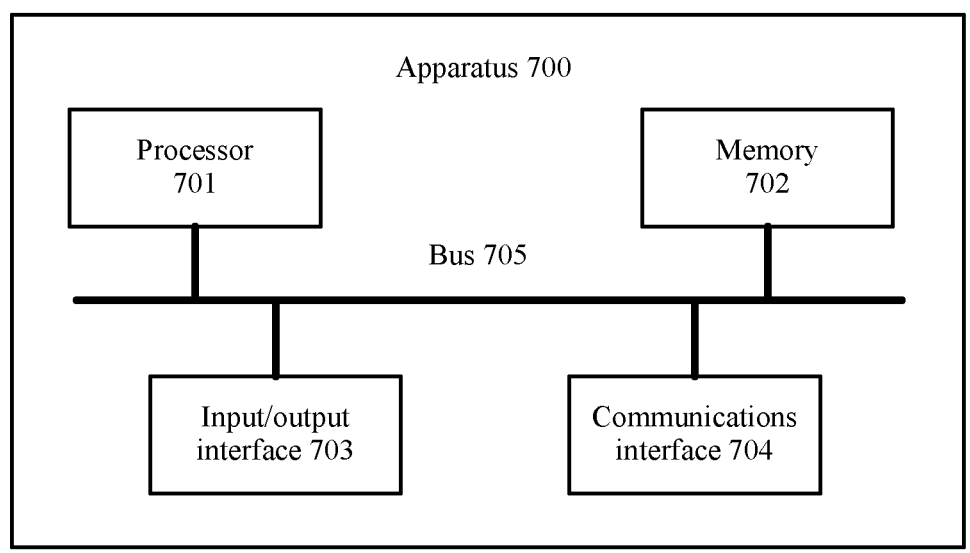
FIG. 8 is a simplified block diagram of a hardware structure of a media data processing apparatus according to an embodiment of this application.

FIG. 7 is a schematic block diagram of a media data processing apparatus according to an embodiment of this application.

The apparatus 600 shown in FIG. 7 includes an obtaining module 601 and a processing module 602. The obtaining module 601 is configured to obtain metadata information The metadata information is attribute information that is used to describe media data The metadata information includes viewpoint identification information. The processing module 602 is configured to process the media data based on the viewpoint identification information.

In this application, because the viewpoint identification information is carried in the metadata information, media data corresponding to different viewpoints can be flexibly processed by using the viewpoint identification information in the metadata information.

FIG. 8 is a schematic diagram of a hardware structure of a media data processing apparatus according to an embodiment of this application. The apparatus 700 shown in FIG. 8 may be considered as a computer device. The apparatus 700 may be used as an implementation of the media data processing apparatus in the embodiments of this application, or may be used as an implementation of the media data processing method in the embodiments of this application. The apparatus 700 includes: a processor 701, a memory 702, an input/output interface 703, and a bus 705, and may further include a communications interface 704. The processor 701, the memory 702, the input/output interface 703, and the communications interface 704 implement mutual communication connections by using the bus 705.

The processor 701 may be a general purpose central processing unit (CPU), a microprocessor, an application-specific integrated circuit (ASIC), or one or more integrated circuits, and is configured to execute a related program, so as to implement functions that need to be performed by the modules in the media data processing apparatus in the embodiments of this application, or perform the media data processing method in the embodiments of this application. The processor 701 may be an integrated circuit chip and has a signal processing capability. In an implementation process, each step of the foregoing method may be completed by using an integrated logical circuit of hardware in the processor 701 or an instruction in a form of software. The processor 701 may be a general purpose processor, a digital signal processor (DSP), an application-specific integrated circuit (ASIC), a field programmable gate array (FPGA), another programmable logic device, a discrete gate, a transistor logic device, or a discrete hardware component. The processor 701 may implement or perform the methods, steps, and logical block diagrams that are disclosed in the embodiments of this application. The general purpose processor may be a microprocessor or the processor may be any conventional processor, or the like. Steps of the methods disclosed in the embodiments of this application may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 702. The processor 701 reads information in the memory 702, and completes, in combination with the hardware of the processor 701, the functions that need to be performed by the modules included in the media data processing apparatus in the embodiments of this application, or performs the media data processing method in the method embodiments of this application.

The memory 702 may be a read-only memory (ROM), a static storage device, a dynamic storage device, or a random access memory (RAM). The memory 702 may store an operating system and another application program. When the functions that need to be performed by the modules included in the media data processing apparatus in the embodiments of this application or the media data processing method in the method embodiments of this application is implemented by using software or firmware, program code used to implement the technical solutions provided in the embodiments of this application is stored in the memory 702, and is executed by the processor 701, to perform operations that need to be performed by the modules in the media data processing apparatus, or perform the media data processing method provided in the method embodiments of this application.

The input/output interface 703 is configured to: receive input data and information; and output data such as an operation result.

The communications interface 704 uses a transceiving apparatus, for example, including but not limited to a transceiver, to implement communication between the apparatus 700 and another device or communications network. The communications interface 704 may be used as an obtaining module or a sending module in a processing apparatus.

The bus 705 may include a path for transmitting information between components (for example, the processor 701, the memory 702, the input/output interface 703, and the communications interface 704) of the apparatus 700.

It should be noted that, although for the apparatus 700 shown in FIG. 8, merely the processor 701, the storage 702, the input/output interface 703, the communications interface 704, and the bus 705 are shown, in a specific implementation process, the apparatus 700 may further include other components required for normal running. For example, the apparatus 700 may further include a display, configured to display video data. In addition, based on a specific requirement, the apparatus 700 may further include a hardware device that implements another additional function. In addition, the apparatus 700 may include only devices required for implementing the embodiments of this application, but not necessarily include all the devices shown in FIG. 8.

The units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. Different methods may be used to implement the described functions for each particular application, but it should not be considered that the implementation goes beyond the scope of this application.

For the purpose of convenient and brief description, for a detailed working process of the system, apparatus, and unit, reference may be made to a corresponding process in the method embodiments. Details are not described herein again.

In the several embodiments provided in this application, the disclosed system, apparatus, and methods may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application.

What is claimed is:

1. A method for presenting media data, comprising:
    receiving, by a media processing device, a media stream, wherein the media stream comprises media data associated with a plurality of viewpoints;
    obtaining, by the media processing device, metadata information of the media stream, wherein the metadata information comprises viewpoint identification information of the viewpoints;
    displaying, by the media processing device, media data of a first viewpoint based on the viewpoint identification information; and
    displaying, by the media processing device, indications of other viewpoints when displaying the media data of the first viewpoint, wherein the indications of the other viewpoints are displayed as icons, each icon corresponding to viewpoint identification information of a different viewpoint receiving by the media processing device, a selection of a second viewpoint when a user selects an icon corresponding to the second viewpoint; and displaying, by the media processing device, media data of the second viewpoint in response to the selection of the second viewpoint by the user.

2. The method according to claim 1, wherein before displaying the media data of the first viewpoint, the method further comprises:

obtaining viewpoint selection information; and determining the first viewpoint based on the viewpoint selection information and the viewpoint identification information;

wherein the viewpoint selection information comprises:

a default viewpoint; or a viewpoint selected by a user of the media processing device.

3. The method according to claim 1, wherein the viewpoint identification information is carried in any one of:

a media data track, supplementary enhancement information (SEI), media presentation description (MPD), and a timed metadata track.

4. The method according to claim 1, wherein the metadata information further comprises viewpoint position information, and viewpoint position information of at least one viewpoint indicates a position of the viewpoint in a spherical coordinate system or a three-dimensional spatial coordinate system.

5. The method according to claim 4, wherein the viewpoint position information of the at least one viewpoint further indicates that the viewpoint is static, and the position of the viewpoint is carried in any one of:

box information, media presentation description (MPD), and supplementary enhancement information (SEI).

6. The method according to claim 4, wherein the viewpoint position information of the at least one viewpoint further indicates that the viewpoint is dynamic, and positions of the viewpoint position are carried in media presentation description (MPD) or a timed metadata track.

7. The method according to claim 1, wherein the metadata information further comprises information of a recommended viewport, and displaying media data of a first viewpoint based on the viewpoint identification information comprises:

displaying the media data of the recommended viewport based on the viewpoint identification information.

8. The method according to claim 7, wherein the information of the recommended viewport is carried in a timed metadata track.

9. A media processing device, comprising a communication interface, a processor and a display unit, wherein the communication interface is configured to receive a media stream, the media stream comprising media data associated with a plurality of viewpoints;

the processor is configured to obtain metadata information of the media stream, the metadata information comprising viewpoint identification information of the viewpoints;

and the display unit is configured to:

display media data of a first viewpoint based on the viewpoint identification information; and display indications of other viewpoints when displaying the media data of the first viewpoint, wherein the indications of the other viewpoints are displayed as icons, each icon corresponding to viewpoint identification information of a different viewpoint;

receive a selection of a second viewpoint when a user selects an icon corresponding to the second viewpoint; and display, media data of the second viewpoint in response to the selection of the second viewpoint by the user.

10. The media processing device according to claim 9, wherein before displaying the media data of the first viewpoint, the processor is further configured to:

obtain viewpoint selection information; and determine the first viewpoint based on the viewpoint selection information and the viewpoint identification information;

wherein the viewpoint selection information comprises:

a default viewpoint; or a viewpoint selected by a user of the media processing device.

11. The media processing device according to claim 1, wherein the processor is configured to obtain the viewpoint identification information from any one of:

a media data track, supplementary enhancement information (SEI), media presentation description (MPD), and a timed metadata track.

12. The media processing device according to claim 9, wherein the metadata information further comprises viewpoint position information, and viewpoint position information of at least one viewpoint indicates a position of the viewpoint in a spherical coordinate system or a three-dimensional spatial coordinate system.

13. The media processing device according to claim 12, wherein the viewpoint position information of the at least one viewpoint further indicates that the viewpoint is static, and the processor is configured to obtain the position of the viewpoint from any one of:

box information, media presentation description (MPD), and supplementary enhancement information (SEI).

14. The media processing device according to claim 12, wherein the viewpoint position information of the at least one viewpoint further indicates that the viewpoint is dynamic, and the processor is configured to obtain positions of the viewpoint from media presentation description (MPD) or a timed metadata track.

15. The media processing device according to claim 9, wherein the metadata information further comprises information of a recommended viewport, and in displaying media data of a first viewpoint based on the viewpoint identification information, the display unit is configured to:

display the media data of the recommended viewport based on the viewpoint identification information.

16. The media processing device according to claim 15, wherein the processor is configured to obtain the information of the recommended viewport from a timed metadata track.

* * * * *